US011048063B2

(12) United States Patent
Ishii et al.

(10) Patent No.: US 11,048,063 B2
(45) Date of Patent: *Jun. 29, 2021

(54) IMAGE SENSOR AND IMAGE CAPTURING APPARATUS

(71) Applicant: CANON KABUSHIKI KAISHA, Tokyo (JP)

(72) Inventors: Mie Ishii, Tokyo (JP); Ken Sasaki, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/596,086

(22) Filed: Oct. 8, 2019

(65) Prior Publication Data
US 2020/0041759 A1 Feb. 6, 2020

Related U.S. Application Data

(63) Continuation of application No. 15/750,547, filed as application No. PCT/JP2016/003900 on Aug. 26, 2016, now Pat. No. 10,514,526.

(30) Foreign Application Priority Data

Sep. 16, 2015 (JP) ................. 2015-183246
Sep. 16, 2015 (JP) ................. 2015-183247
Jul. 22, 2016 (JP) ................. 2016-144756

(51) Int. Cl.
G02B 7/34 (2021.01)
H04N 5/345 (2011.01)
(Continued)

(52) U.S. Cl.
CPC ............... *G02B 7/34* (2013.01); *G03B 13/36* (2013.01); *H04N 5/23212* (2013.01);
(Continued)

(58) Field of Classification Search
CPC ................. G02B 7/34; H04N 5/36961; H04N 5/232933; H04N 5/37457;
(Continued)

(56) References Cited

U.S. PATENT DOCUMENTS 10,514,526 B2 * 12/2019 Ishii .................. H04N 5/23212
2007/0285548 A1 12/2007 Gomi
(Continued)

FOREIGN PATENT DOCUMENTS

CN 103685910 A 3/2014
CN 104427265 A 3/2015
(Continued)

OTHER PUBLICATIONS

The International Search Report of the corresponding International Application, PCT/JP2016/003900 dated Nov. 8, 2016.
(Continued)

Primary Examiner — Gevell V Selby
(74) Attorney, Agent, or Firm — Cowan, Liebowitz & Latman, P.C.

(57) ABSTRACT

An image sensor includes a pixel portion in which a plurality of unit pixels each having one micro lens and a plurality of photoelectric conversion portions are arrayed in a matrix, a signal readout portion that reads out signals accumulated in the photoelectric conversion portions and converts the read signals to digital signals, a signal processor that processes signals read out by the signal readout portion and has an image capture signal processor that performs signal processing for generating a captured image on signals read out by the signal readout portion and a focus detection signal processor that performs signal processing for focus detection on signals read out by the signal readout portion, and an output portion that outputs signals processed by the signal processor.

19 Claims, 19 Drawing Sheets

(51) Int. Cl.
  *H04N 5/3745* (2011.01)
  *H04N 5/232* (2006.01)
  *H04N 5/369* (2011.01)
  *G03B 13/36* (2021.01)

(52) U.S. Cl.
  CPC . *H04N 5/232122* (2018.08); *H04N 5/232127* (2018.08); *H04N 5/232933* (2018.08); *H04N 5/3456* (2013.01); *H04N 5/3696* (2013.01); *H04N 5/36961* (2018.08); *H04N 5/3745* (2013.01); *H04N 5/37457* (2013.01); *H04N 5/23219* (2013.01)

(58) Field of Classification Search
  CPC ....... H04N 5/232122; H04N 5/232127; H04N 5/3696; H04N 5/3456; H04N 5/23212; H04N 5/3745; H04N 5/23219; G03B 13/36
  See application file for complete search history.

(56) References Cited

U.S. PATENT DOCUMENTS

| | | |
|---|---|---|
| 2009/0168154 A1 | 7/2009 | Irie |
| 2010/0067892 A1 | 3/2010 | Kimoto |
| 2013/0321694 A1 | 12/2013 | Shin et al. |
| 2014/0192249 A1 | 7/2014 | Kishi |
| 2015/0062102 A1 | 3/2015 | Ikeda |
| 2015/0062394 A1 | 3/2015 | Ikeda et al. |
| 2015/0256778 A1 | 9/2015 | Kusaka |
| 2016/0198110 A1 | 7/2016 | Ikedo |
| 2016/0239974 A1* | 8/2016 | Wang .................. G06T 7/55 |

FOREIGN PATENT DOCUMENTS

| | | |
|---|---|---|
| CN | 104580851 A | 4/2015 |
| CN | 104519276 A | 5/2015 |
| CN | 104685399 A | 6/2015 |
| EP | 2843939 A3 | 5/2015 |
| JP | 2005-278135 A | 10/2005 |
| JP | 3774597 B | 5/2006 |
| JP | 2007-324985 A | 12/2007 |
| JP | 2009-089105 A | 4/2009 |
| JP | 2012-049994 A | 3/2012 |
| JP | 2013-051674 A | 3/2013 |
| JP | 2014-146023 A | 8/2014 |
| JP | 2015-046761 A | 3/2015 |
| JP | 2015126284 A | 7/2015 |
| KR | 10-2013-0018545 A | 2/2013 |

OTHER PUBLICATIONS

A Apr. 26, 2019 Korean Office Action, which is enclosed without an English Translation, that issued in Korean Patent Application No. 10-2018-7010064.

A Oct. 21, 2019 Chinese Office Action, which is enclosed with an English Translation, that issued in Chinese Patent Application No. 201680053357.3.

The Sep. 25, 2020 Japanese Office Action, which is enclosed without an English Translation, that issued in Japanese Patent Application No. 2016144756.

* cited by examiner

IMAGE SENSOR AND IMAGE CAPTURING APPARATUS

CROSS-REFERENCE TO RELATED APPLICATION

This application is a continuation of application Ser. No. 15/750,547, filed Feb. 6, 2018, which is a national stage of International Application No. PCT/JP2016/003900, filed Aug. 26, 2016 the entire disclosures of which is hereby incorporated by reference.

TECHNICAL FIELD

The present invention relates to an image sensor and an image capturing apparatus.

BACKGROUND ART

In recent years, advancements in the high-functionality and multi-functionality of image capturing apparatuses that use a CMOS image sensor or the like have been made to support various needs. Increases in pixel count and advancements in high-speed imaging have been made to CMOS image sensors, and there is increasing demand for methods that allow for faster reading out of pixel signals.

For example, a method for performing high-speed reading out that has been in widespread use in recent years involves disposing an analog-to-digital conversion circuit (hereinafter, column ADC) every column and performing digital output, as disclosed in Japanese Patent Laid-Open No. 2005-278135. By introducing column ADCs, it becomes possible to perform digital transmission of pixel signals to outside of the image sensor, and high-speed readout has become possible following technical improvements in digital signal transmission.

On the other hand, as an example of multi-functionalization, an image capturing apparatus capable of, for example, acquiring not only the intensity distribution of light but also the incident direction and distance information of light has been proposed. Japanese Patent No. 3774597 discloses an image sensor capable of focus detection using signals obtained from the image sensor. The image sensor has a configuration in which a photodiode (hereinafter, PD) corresponding to one micro lens is divided in two, such that each PD receives light from a different pupil surface of the taking lens. Focus detection is performed by comparing the outputs of the two PDs. A normal captured image can also be obtained by adding together the output signals from the two PDs constituting a unit pixel.

An image capturing apparatus disclosed in Japanese Patent Laid-Open No. 2009-89105 is provided with a mode for reading out focus detection signals, exposure control signals and image capture signals for live view display from a solid-state image sensor with one vertical scan of the same frame. The image capturing apparatus disclosed in Japanese Patent Laid-Open No. 2009-89105 is described as being able to perform live view display with faster focus detection control and exposure control.

However, since the signals of all of the PDs need to read out in the case of performing focus detection and exposure control in an image sensor such as disclosed in Japanese Patent No. 3774597 and Japanese Patent Laid-Open No. 2009-89105, there is a problem in that the time required to read out the signals of the PDs increases and the frame rate decreases. Even if the signal readout time is reduced by a readout method using column ADCs such as in Patent Document 1, further increases in pixel count and frame rate are expected in the future, and thus further shortening of the signal readout time is desired.

SUMMARY OF INVENTION

The present invention has been made in view of the abovementioned problems, and provides an image sensor that is able to greatly shorten the time taken in order for signals required in drive control of an image capturing apparatus, such as focus detection signals, to be output from the image sensor.

According to a first aspect of the present invention, there is provided an image sensor comprising: a pixel portion in which a plurality of unit pixels each having one micro lens and a plurality of photoelectric conversion portions are arrayed in a matrix; a signal holding portion configured to hold signals output from the unit pixels of an entire area of the pixel portion; a signal processor configured to process signals held by the signal holding portion, and having an image capture signal processor configured to perform signal processing for generating a captured image on signals held by the signal holding portion and a focus detection signal processor configured to perform signal processing for focus detection on signals held by the signal holding portion; and an output portion configured to output signals processed by the signal processor.

According to a second aspect of the present invention, there is provided an image capturing apparatus comprising: an image sensor; an image processor configured to process signals output from the image sensor and generate an image; and a focus detector configured to process read signals and perform focus detection, wherein the image sensor includes: a pixel portion in which a plurality of unit pixels each having one micro lens and a plurality of photoelectric conversion portions are arrayed in a matrix; a signal holding portion configured to hold signals output from the unit pixels of an entire area of the pixel portion; a signal processor configured to process signals held by the signal holding portion, and having an image capture signal processor configured to perform signal processing for generating a captured image on signals held by the signal holding portion and a focus detection signal processor configured to perform signal processing for focus detection on signals held by the signal holding portion; and an output portion configured to output signals processed by the signal processor.

According to a third aspect of the present invention, there is provided an image sensor comprising: a pixel portion in which a plurality of pixels configured to photoelectrically convert light from a subject are disposed; a readout portion configured to read out signals from the pixel portion; and an output portion configured to output, among the signals read out by the readout portion, the signals of the pixels of an entire area of the pixel portion to outside of the image sensor, as signals for generating an image, and the signals of the pixels of a partial area of the pixel portion to outside of the image sensor, as signals for calculating an evaluation value to be used in drive control of an apparatus that includes the image sensor.

According to a fourth aspect of the present invention, there is provided an image sensor comprising: a pixel portion in which a plurality of pixels configured to photoelectrically convert light from a subject are disposed; a readout portion configured to read out signals from the pixel portion; a phase difference detection portion configured to calculate a phase difference evaluation value to be used in focus detection control employing a phase difference detection method; and an output portion configured to output, among the signals read out by the readout portion, the signals of the pixels of an entire area of the pixel portion to outside of the image sensor, as signals for generating an image, and the phase difference evaluation value calculated by the phase difference detection portion using the signals of the pixels of a partial area of the pixel portion to outside of the image sensor.

According to a fifth aspect of the present invention, there is provided an image capturing apparatus comprising: an image sensor including: a pixel portion in which a plurality of pixels configured to photoelectrically convert light from a subject are disposed; a readout portion configured to read out signals from the pixel portion; and an output portion configured to output, among the signals read out by the readout portion, the signals of the pixels of an entire area of the pixel portion to outside of the image sensor, as signals for generating an image, and the signals of the pixels of a partial area of the pixel portion to outside of the image sensor, as signals for calculating an evaluation value to be used in drive control of an apparatus that includes the image sensor; and a selector configured to select the partial area.

Further features of the present invention will become apparent from the following description of exemplary embodiments with reference to the attached drawings.

DESCRIPTION OF EMBODIMENTS

Hereinafter, embodiments of the present invention will be described in detail with reference to the accompanying drawings.

First Embodiment

Figure 1:
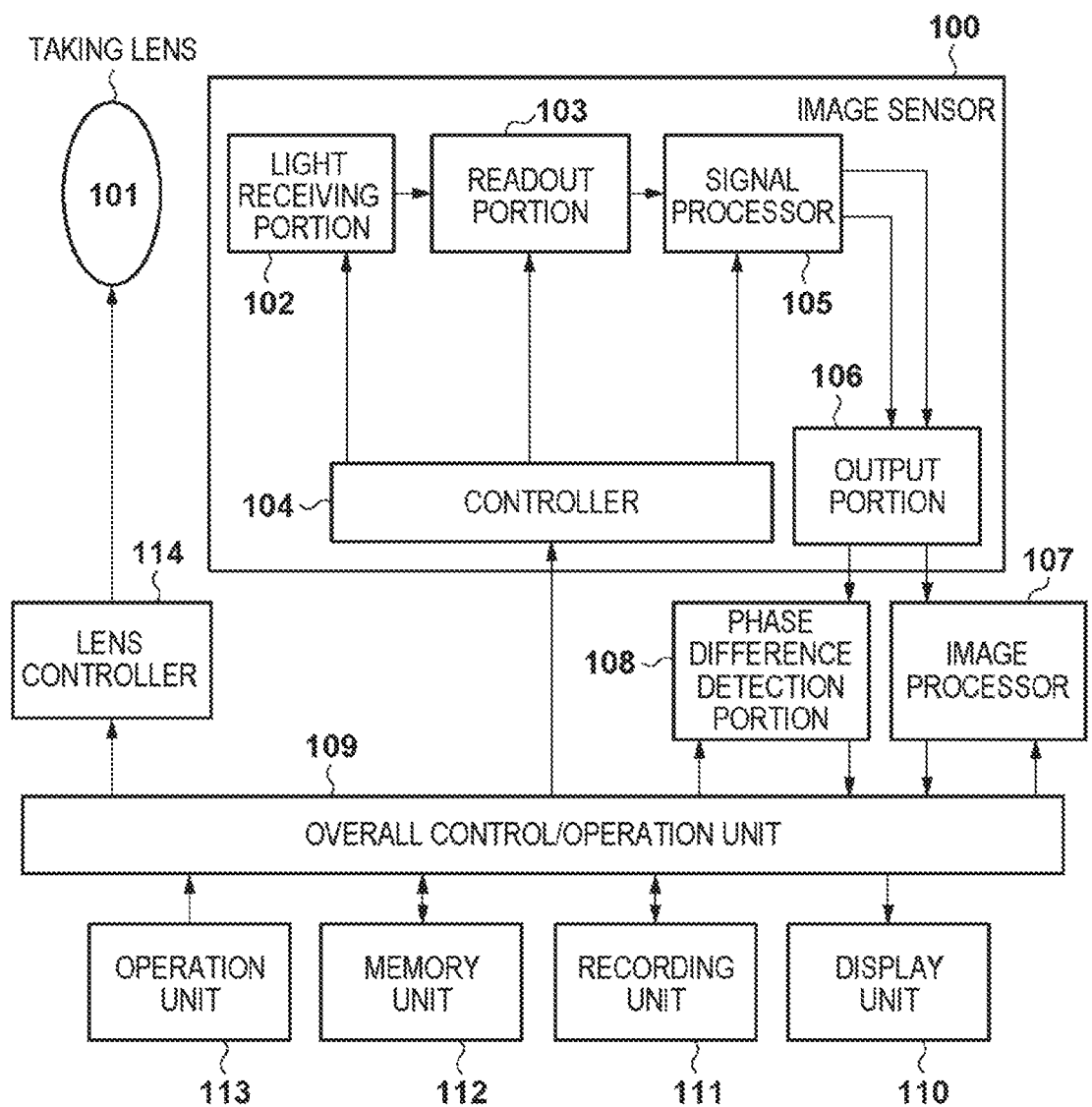
FIG. 1 is a block diagram showing the configuration of an image capturing apparatus according to a first embodiment of the present invention.

FIG. 1 is a block diagram showing the configuration of an image capturing apparatus having an image sensor of the first embodiment of the present invention. An image sensor 100 is configured to be provided with a light receiving portion 102, a readout portion 103, a controller 104, a signal processor 105, and an output portion 106. The light receiving portion 102 has a plurality of unit pixels that are disposed in a matrix, and receives the light of an optical image formed by the taking lens 101. The configuration of the light receiving portion 102 will be discussed later. The readout portion (A/D conversion portion) 103, on receipt of a drive control signal of the controller 104, A/D converts image signals that are output from the light receiving portion 102, and sends the A/D converted image signals to the signal processor 105.

The signal processor 105 performs computational operation processing such as addition, subtraction and multiplication of signals, processing for selecting signals to be output to the outside from the image sensor 100 via the output portion 106, and the like on the A/D converted image signals. Also, the signal processor 105 performs processing including various types of correction such as reference level adjustment and the like, and rearrangement of data. This processing is performed on receipt of a control signal from the controller 104. The signal processor 105, which will be discussed in detail later, performs image capture signal processing and focus detection signal processing on image signals obtained from the light receiving portion 102, and sends the processed image signals to the output portion 106. The output portion 106 outputs the image signals processed by the signal processor 105 to outside of the image sensor 100.

The image processor 107 receives image capture signals from the output portion 106 of the image sensor 100, performs image processing such as defective pixel correction, noise reduction, color conversion, white balance correction and image correction, resolution conversion processing and image compression processing, and generates still images or moving images. A phase difference detection portion 108, on receipt of a focus detection signal from the output portion 106, calculates a phase difference evaluation value for performing focus detection.

An overall control/operation unit 109 performs overall drive and control of the image sensor 100 and the entire image capturing apparatus. A display unit 110 displays shot images, live view images, various setting screens, and the like. A recording unit 111 and a memory unit 112 are recording media such as a nonvolatile memory or a memory card that record and hold image signals output from the overall control/operation unit 109, and the like. An operation unit 113 receives commands from a user using an operation member provided to the image capturing apparatus, and inputs the commands to the overall control/operation unit 109. A lens controller 114 calculates optical system drive information based on the phase difference evaluation value calculated by the phase difference detection portion 108, and controls the position of a focus lens of the taking lens 101.

Next, the relationship between the taking lens 101 in the image capturing apparatus of the present embodiment and the light receiving portion 102 of the image sensor 100, the definition of a pixel, and the principles of focus detection using a pupil division method will be described.

Figure 2:
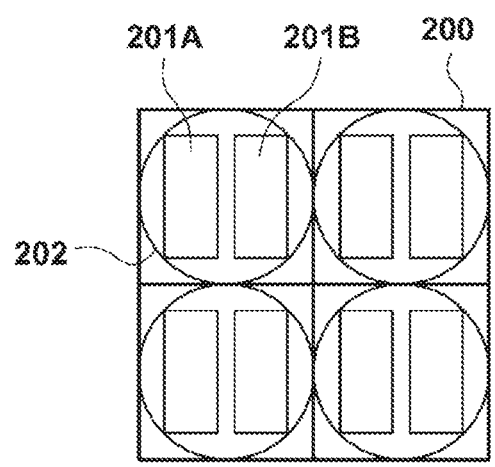
FIG. 2 is a diagram illustrating the configuration of unit pixels of an image sensor of the first embodiment.

FIG. 2 is a schematic diagram showing the configuration of unit pixels 200 of the image sensor 100. In FIG. 2, a micro lens 202 further focuses light formed into an image on the image sensor 100 by the taking lens 101 on a pixel-by-pixel basis. Photoelectric conversion portions 201A and 201B composed of photodiodes (PDs) receive light incident on the unit pixel 200, and generate and accumulate signal charge that depends on the amount of received light. As a result of the unit pixel 200 having two photoelectric conversion portions under one micro lens 202, the two photoelectric conversion portions 201A and 201B are each capable of receiving light that has passed through an exit pupil area divided in two. The signal obtained by combining the two signals of the photoelectric conversion portions 201A and 201B on a pixel-by-pixel basis is the output signal of one pixel serving as an image generation pixel. Also, focus detection of the taking lens 101 can be performed by comparing the signals that are obtained from the two photoelectric conversion portions on a pixel-by-pixel basis. That is, focus detection employing a phase difference detection method according to which the pupil is divided in the left-right direction is possible by performing a correlation operation on the signal that is obtained from the photoelectric conversion portion 201A and the signal that is obtained from the photoelectric conversion portion 201B in a certain area within the unit pixel 200.

Figure 3:
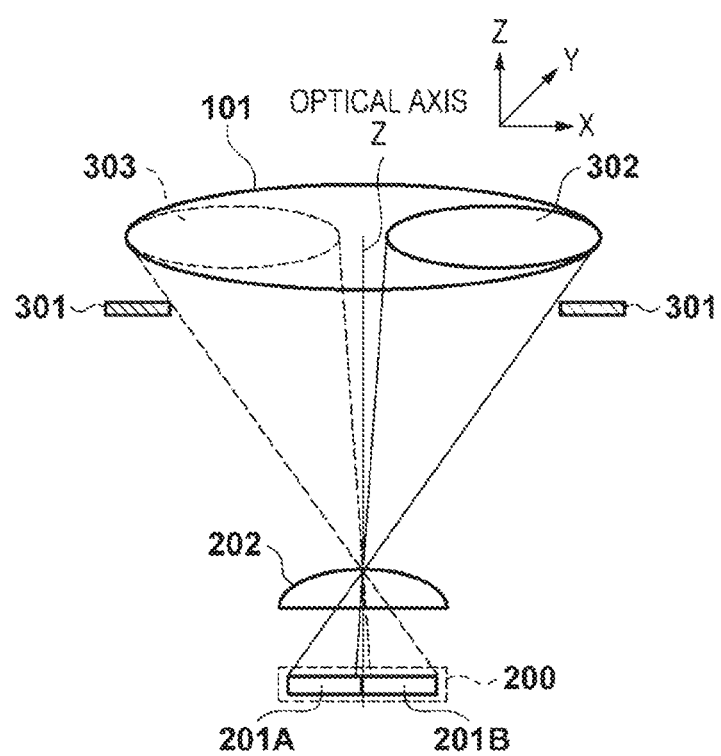
FIG. 3 is a conceptual view in which light beams emitted through an exit pupil of a taking lens are incident on a unit pixel.

FIG. 3 is a diagram in which light that has passed through the taking lens 101 passes through the single micro lens 202 and is receiving by the unit pixel 200 of the light receiving portion 102 of the image sensor 100 as observed from a direction perpendicular (Y-axis direction) to the optical axis (Z-axis). Light that has passed through exit pupils 302 and 303 of the taking lens is incident on the unit pixel 200 so as to be centered on the optical axis. At this time, the amount of incident light is adjusted by a lens diaphragm 301. As shown in FIG. 3, the light beam that passes through the pupil area 302 passes through the micro lens 202 and is received by the photoelectric conversion portion 201A, and the light beam that passes through the pupil area 303 passes through the micro lens 202 is received by the photoelectric conversion portion 201B. Accordingly, the photoelectric conversion portions 201A and 201B each receive light from different areas of the exit pupil of the taking lens.

The signal of the photoelectric conversion portion 201A that pupil divides the light from the taking lens 101 is acquired from a plurality of unit pixels 200 arranged side-by-side in the X-axis direction, and the subject image constituted by this group of output signals is given as an A image. The signal of the photoelectric conversion portion 201B that similarly pupil divides the light from the taking lens 101 is acquired from a plurality of unit pixels 200 arranged side-by-side in the X-axis direction, and the subject image constituted by this group of output signals is given as a B image.

A correlation operation is implemented on the A image and the B image, and the amount of image shift (pupil division phase difference) is detected. Furthermore, by multiplying the amount of image shift by a conversion factor that is determined from the optical system and the focal position of the taking lens 101, a focal position corresponding to an arbitrary subject position within the screen can be calculated. By controlling the focal position of the taking lens 101 based on focal position information calculated here, image capture plane phase difference AF (autofocus) becomes possible. Also, by giving a signal obtained by adding together the A image signal and the B image signal as an A+B image signal, this A+B image signal can be used as a normal shot image.

Figure 4:
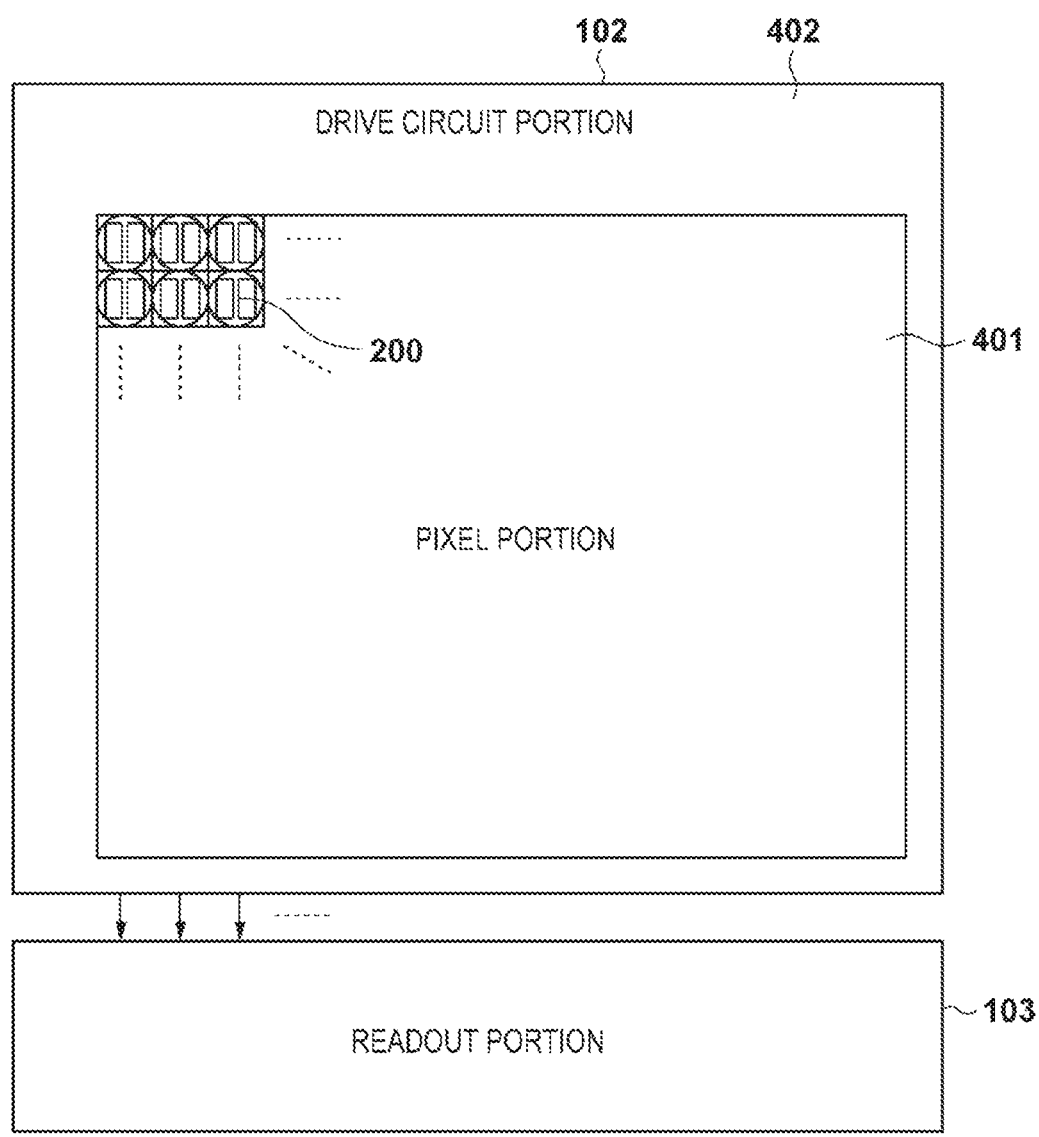
FIG. 4 is a block diagram showing the configuration of the image sensor of the first embodiment.

Next, the configurations of the light receiving portion 102 and the readout portion 103 of the image sensor 100 will be described using FIGS. 4 and 5. FIG. 4 is a block diagram showing an exemplary configuration of the light receiving portion 102 and the readout portion 103 of the image sensor 100. The light receiving portion 102 has a pixel portion 401 and a drive circuit portion 402. A plurality of unit pixels 200 are arrayed horizontally (row direction) and vertically (column direction) in the pixel portion 401. Although a total of six unit pixels 200 (2 rows×3 columns) are illustrated in FIG. 4, millions or tens of millions of unit pixels 200 are actually disposed. The drive circuit portion 402 includes a power supply circuit, a timing generator (TG), a scanning circuit, and the like for driving the pixel portion 401. By driving the pixel portion 401 using the drive circuit portion 402, pixel signals of the entire image capture area of the pixel portion 401 are output from the pixel portion 401 to the readout portion 103. The drive circuit portion 402 is driven on receipt of a control signal from the controller 104 of FIG. 1. Analog-to-digital conversion (A/D conversion) is performed on the pixel signals from the pixel portion 401 that are input to the readout portion 103. Note that the readout portion 103 is configured to be provided with a plurality of readout circuits, such as one readout circuit per column, for example.

Incidentally, with regard to the method of driving the pixel portion 401, noise such as crosstalk and blooming tends to occur when rows that are adjacent to each other are driven under different conditions (frame rate, accumulation time, etc.). However, in the present embodiment, since the drive circuit portion 402 drives the entire area of the pixel portion 401 uniformly under the same conditions, such problems do not arise.

Figure 5:
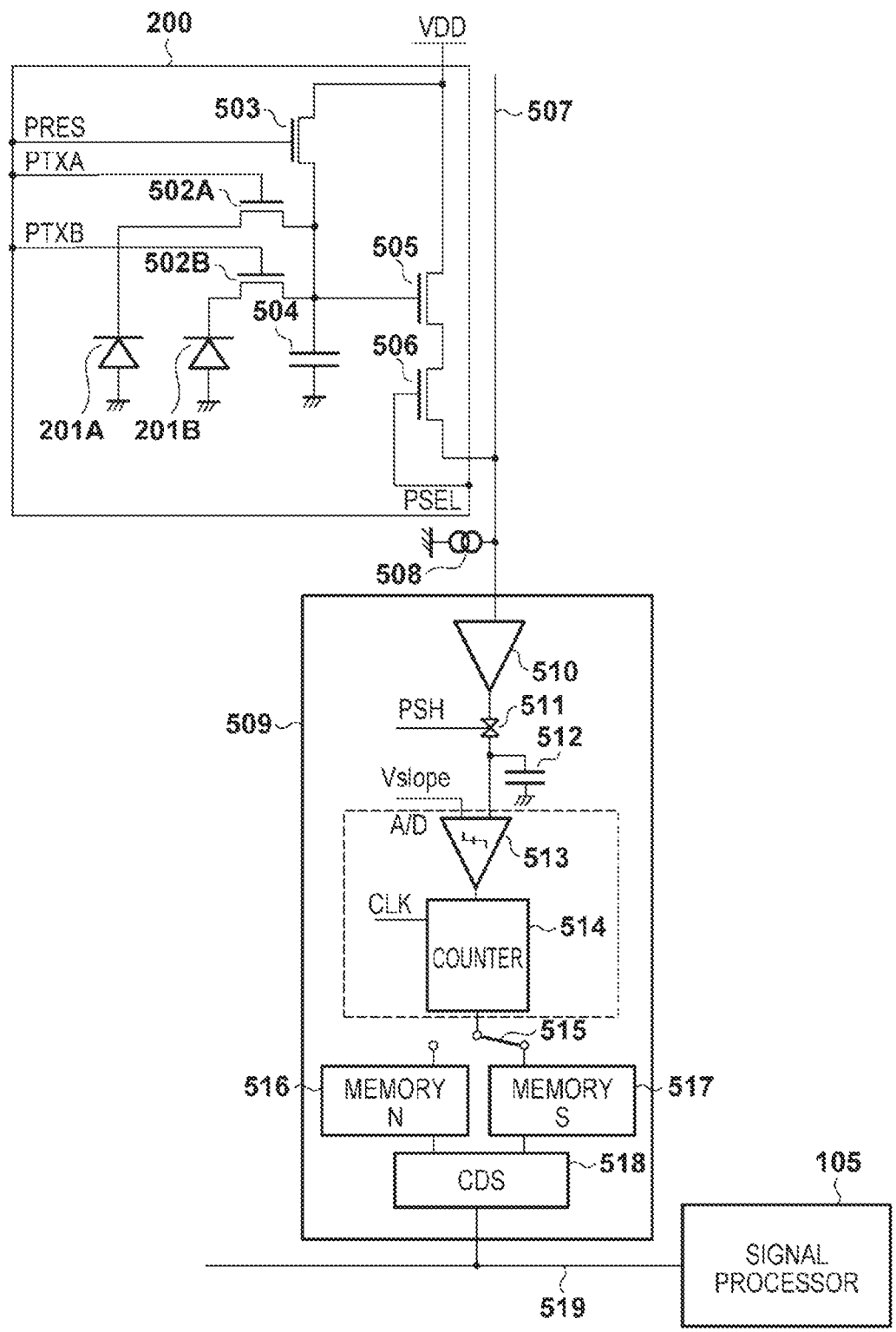
FIG. 5 is a diagram illustrating a pixel circuit and a readout circuit of an image sensor of the first embodiment.

FIG. 5 is a diagram showing an example of the unit pixel 200 of the image sensor 100 and a readout circuit 509 constituting the readout portion 103. In the unit pixel 200, a transfer switch 502A is connected to the photoelectric conversion portion 201A composed of a photodiode (PD), and a transfer switch 502B is connected to the photoelectric conversion portion 201B. Charge generated by the photoelectric conversion portions 201A and 201B is respectively transferred to a common floating diffusion portion (FD) 504 via the transfer switches 502A and 502B, and is temporarily saved. The charge transferred to the FD 504 is output to a column output line 507 as a voltage corresponding to the charge via an amplification MOS transistor (SF) 505 forming a source follower amplifier when a selection switch 506 is turned on. A current source 508 is connected to the column output line 507.

A reset switch 503 resets the potential of the FD 504 to VDD, and the potentials of the photoelectric conversion portions 201A and 201B to VDD via the transfer switches 502A and 502B. The transfer switches 502A and 502B, the reset switch 503, and the selection switch 506 are respectively controlled by control signals PTXA, PTXB, PRES and PSEL, via signal lines that are connected to the drive circuit portion 402, which on the periphery thereof.

Next, the circuit configuration of the readout circuit 509 will be described. An amplifier 510 amplifies the signal output by the column output line 507, and a capacitor 512 is used in order to hold the signal voltage. Writing to the capacitor 512 is controlled by a switch 511 that is turned on and off using a control signal PSH. A reference voltage Vslope supplied from a slope voltage generation circuit (not shown) is input to one input of a comparator 513, and the output of the amplifier 510 written to the capacitor 512 is input to the other input. The comparator 513 compares the output of the amplifier 510 and the reference voltage Vslope, and outputs one of two values, namely, low level and high level, depending on the magnitude relationship therebetween. Specifically, low level is output in the case where the reference voltage Vslope is smaller than the output of the amplifier 510, and high level is output in the case where the reference voltage Vslope is larger. A clock CLK starts at the same time that the reference voltage Vslope starts to transition, and a counter 514 counts up in correspondence with the clock CLK in the case where the output of the comparator 513 is high level, and stops the signal of the count at the same time when the output of the comparator 513 is reversed to low level. The count value at this time is held in one of a memory 516 and a memory 517 as a digital signal.

The memory 516 holds a digital signal obtained by A/D converting the signal (hereinafter, "N signal") of the reset level of the FD 504, and the memory 517 holds a digital signal obtained by A/D converting a signal (hereinafter, "S signal") obtained by superimposing the signal of the photoelectric conversion portion 201A or the photoelectric conversion portion 201B on the N signal of the FD 504. Whether the count value of the counter 514 is written to the memory 516 or 517 is assigned by the switch 515. The difference between the signals held in the memories 516 and 517 is calculated by subtracting the N signal from the S signal with a CDS circuit 518. This difference is then output to the signal processor 105 via a digital signal output line 519, under the control of the drive circuit portion 402.

Note that one readout circuit 509 is disposed per column of pixels, and pixel signals are read out in units of rows. In this case, the selection switch 506 is controlled in units of rows, and the pixel signals of the selected row are output at the same time to respective column output lines 507. The pixel signals of the pixel portion 401 can be read out to the signal processor 105 faster as the number of readout circuits 509 increases.

Figure 6:
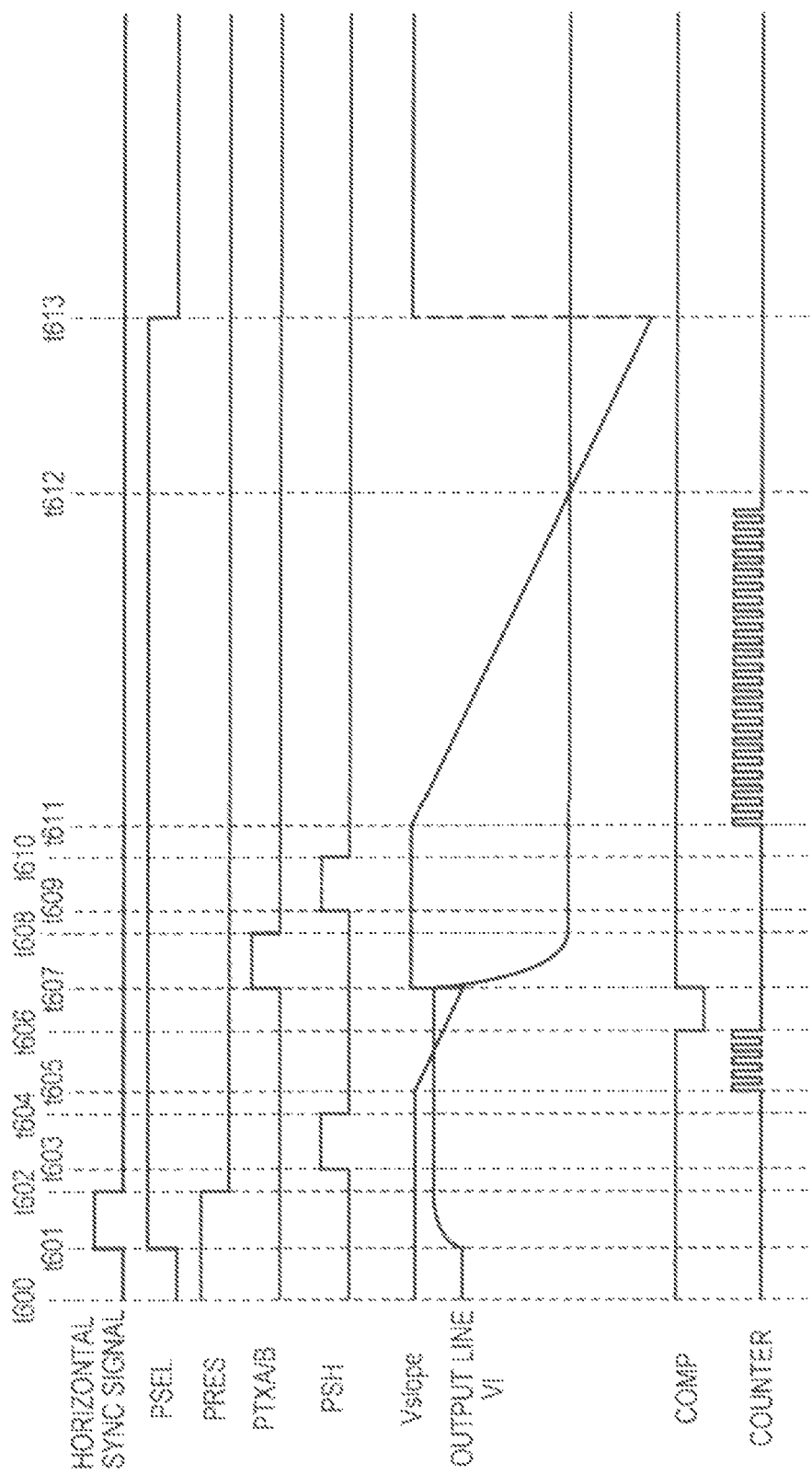
FIG. 6 is a timing chart showing a signal readout operation of the image sensor of the first embodiment.

FIG. 6 is a timing chart showing an example of an operation for reading out charge from the unit pixels 200 of the image sensor 100 having the circuit configuration shown in FIG. 5. The timing of each drive pulse, the reference voltage Vslope, the clock CLK, and the horizontal scanning signal are schematically shown. A potential Vl of the column output line 507 at each timing is also shown.

Prior to reading out the signal from the photoelectric conversion portion 201A, the signal line PRES of the reset switch 503 changes to Hi (t600). The gate of the SF (source follower amplifier) 505 is thereby reset to a reset power supply voltage. The control signal PSEL is set to Hi at time t601, and the SF 505 enters an operating state. Resetting of the FD 504 is canceled by setting the control signal PRES to Lo at t602. The potential of the FD 504 at this time is output to the column output line 507 as a reset signal level (N signal), and input to the readout circuit 509.

By setting the control signal PSH to Hi and Lo at times t603 and t604 to turn the switch 511 on and off, the N signal output by the column output line 507 is held in the capacitor 512 after being amplified by a desired gain in the amplifier 510. The potential of the N signal held in the capacitor 512 is input to one input of the comparator 513. After the switch 511 is turned off at time t604, the reference voltage Vslope is decreased over time from an initial value by a slope voltage generation circuit (not shown) from time t605 to t607. The clock CLK is supplied to the counter 514 together with the reference voltage Vslope starting to transition. The value of the counter 514 increases according to the number of CLKs. Then, when the reference voltage Vslope input to the comparator 513 reaches the same level as the N signal, an output COMP of the comparator 513 changes to low level, and operation of the counter 514 also stops at the same time (time t606). The value of the counter 514 at the time that operation stops will be the A/D converted value of the N signal. The counter 514 is then connected to the memory 516 by the switch 515, and the digital value of the N signal is held in the N signal memory 516.

Next, the photoelectric charge accumulated in the photoelectric conversion portion 201A is transferred the FD 504 by setting the control signal PTXA to Hi and then Lo at times t607 and t608 after holding the digitized N signal in the N signal memory 516. Then, the change in the potential of the FD 504 that depends on the amount of charge is output to the column output line 507 as the signal level (optical component+reset noise component (N signal)), and input to the readout circuit 509. The input signal (S(A)+N), after being amplified by a desired gain in the amplifier 510, is held in the capacitor 512 at the timing at which the switch 511 is turned on and off by the control signal PSH being set to Hi and then Lo at times t609 and t610. The potential held in the capacitor 512 is input to one input of the comparator 513. After the switch 511 is turned off at time t610, the reference voltage Vslope is decreased over time from the initial value by the slope voltage generation circuit from time t611 to t613. CLK is supplied to the counter 514 together with the reference voltage Vslope starting to transition. The value of the counter 514 increases according to the number of CLKs. Then, when the reference voltage Vslope input to the comparator 513 reaches the same level as the S signal, the output COMP of the comparator 513 changes to low level, and the operation of the counter 514 also stops at the same time (time t612). The value of the counter 514 at the time that operation stops is the A/D converted value of the S(A)+N signal. The memory 517 is then connected to the counter 514 by the switch 515, and the digital value of the S(A)+N signal is held in the S signal memory 517. A differential signal level (optical component) is calculated by the CDS circuit 518 from the signals held in the memory 516 and the memory 517, and an S(A) signal from which the reset noise component has been removed is acquired. The S(A) signal is sequentially sent to the signal processor 105 under the control of the controller 104.

Operations for reading out signals from the photoelectric conversion portion 201A of the unit pixel 200 have been described above. In the case of reading out signals from the other photoelectric conversion portion 201B of the unit pixel 200, driving need only be similarly performed in accordance with the timing chart of FIG. 6. In this case, however, the control signal PTXB is set to Hi and then Lo at times t607 and t608, instead of the control signal PTXA. That is, by setting the control signal PTXA to Hi and Lo to output the pixel signal S(A) when driving from time t600 to time t613 in FIG. 6 is performed the first time, and then setting the control signal PTXB to Hi and Lo to output the pixel signal S(B) when driving from time t600 to time t613 in FIG. 6 is performed the second time, output of one row of image signals is completed. By repeating this for all of the rows, output of the pixel signals S(A) and S(B) of all the pixels is completed.

Figure 7:
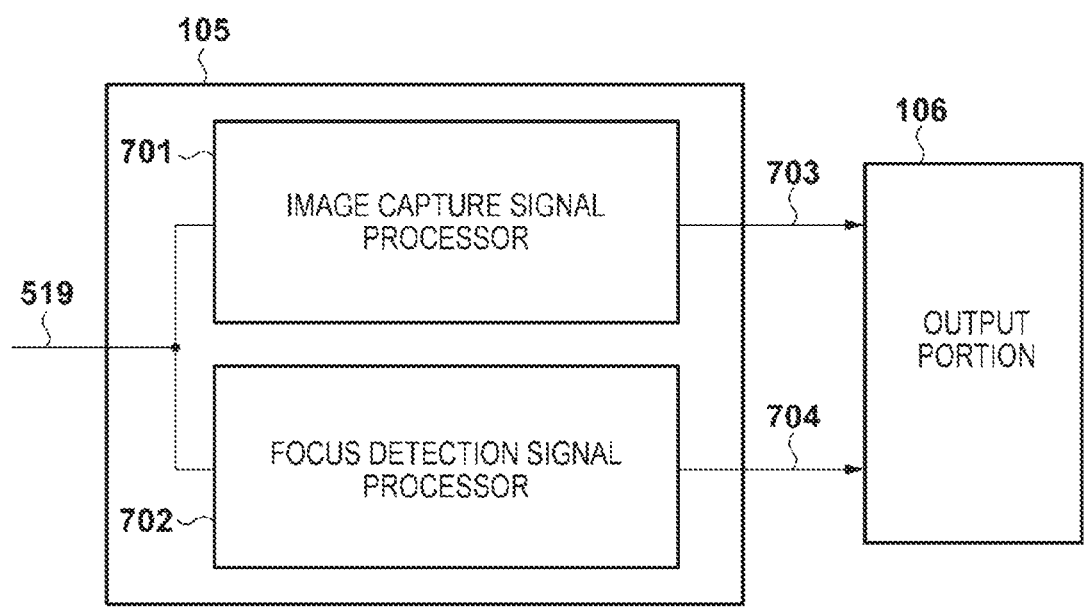
FIG. 7 is a diagram illustrating the configuration of a signal processor in the image sensor of the first embodiment.

FIG. 7 is a diagram showing an exemplary configuration of the signal processor 105 and the output portion 106 of the image sensor 100. The signal processor 105 has an image capture signal processor 701 and a focus detection signal processor 702. The pixel signals output from the readout portion 103 are input to the signal processor 105 via the digital signal output line 519. The input signals are processed in accordance with control from the controller 104. Note that the image capture signal processor 701 and the focus detection signal processor 702 are each assumed to be provided with a memory (not shown).

In the image capture signal processor 701, an image capture signal is calculated from the signals output from the readout portion 103. That is, the image capture signal processor 701 receives the pixel signals S(A) and S(B) of the photoelectric conversion portion 201A and the photoelectric conversion portion 201B of the unit pixel 200 and performs combination processing to calculate an S(A+B) signal. The image capture signal processor 701 then sends the pixel signal S(A+B) to the output portion 106 via an image capture signal output line 703. The image capture signal processor 701 is able to reduce the amount of signal transmission to outside of the image sensor 100, by combining the pixel signals S(A) and S(B) of the two photoelectric conversion portions and outputting the combined signal to outside of the image sensor 100 from the output portion 106. Note that operation of the pixel signal S(A) and the pixel signal S(B) becomes possible at the stage at which both pixel signals of the unit pixel are brought together. The pixel signal S(A) read out first is held in memory, and when the pixel signal S(B) is read out and input to the image capture signal processor 701, the operation S(A)+S(B) is sequentially performed, and the resultant signal is output from the output portion 106.

Note that the image capture signal processor 701 may further perform processing such as combining and averaging the signals of the unit pixels 200. For example, in a pixel portion having a typical configuration in which red (R), green (G) and blue (B) color filters are provided in a Bayer array, the signal transmission amount can be further reduced if the signals of adjacent pixels of the same color are combined and averaged before being output to the output portion 106. Also, rather than output the signals of the entire pixel portion to the output portion 106, the signals of only a required area may be output. This processing is controlled by the controller 104.

Next, processing by the focus detection signal processor 702 will be described. The focus detection signal processor 702 calculates a focus detection signal from the signals output from the readout portion 103, and outputs the calculated focus detection signal. In order to perform phase difference detection, the pixel signal S(A) and the pixel signal S(B) are both required, as described above. However, the signal transmission amount is huge when the pixel signals S(A) and the pixel signals S(B) of all the pixels of the pixel portion 401 are output to outside of the image sensor 100 from the output portion 106, and this serves as an impediment to high-speed readout.

In view of this, computational operation processing is performed in the focus detection signal processor 702, and a reduced amount of signals are output from the output portion 106. For example, luminance values Y are calculated by respectively performing Bayer addition on the pixel signals S(A) and S(B), and luminance signals Y(A) and Y(B) are output. The computational operations for focus detection may also be performed after converting the signals into Y values, and the signal transmission amount can be reduced to one quarter, by converting the signals into Y values before being output from the image sensor 100. Note that since signals in Bayer units are required in calculating the Y values, the pixel signals input to the focus detection signal processor 702 are held in memory until the signals required for calculation are brought together. In other words, because the signals of the G and B rows are output after the signals of the R and G rows have been output, the pixel signals S(A) and the pixel signals S(B) of the R and G rows are held in memory, and when the signals of the G and B rows are output, computational operations are sequentially performed on the luminance signals Y(A) and Y(B), and the resultant signals are output from the output portion 106 via a signal line 704.

Also, the focus detection signal processor 702 may further perform a correlation operation, and output the resultant value to the output portion 106 through the signal line 704. Note that phase difference detection using a correlation operation can be implemented by a well-known technique. In the case of outputting only correlation operation values, the amount of signals that are output can be greatly reduced, although this is dependent on the number of divided areas at the time of the correlation operation.

As described above, signal processing for outputting only required signals to outside of the image sensor 100 is performed in the image sensor 100 that is provided with the image capture signal processor 701 and the focus detection signal processor 702. The signal transmission amount can thereby be reduced, and image capture data and focus detection information can both be obtained at high speed.

Note that, in the present embodiment, a configuration was adopted in which a memory is provided in both the image capture signal processor 701 and the focus detection signal processor 702. However, a configuration may be adopted in which the memories are provided upstream thereof, and signals are sent to the image capture signal processor 701 and the focus detection signal processor 702 at the stage at which the signals required in the computational operations in each processing portion are brought together.

Also, in the description of the present embodiment, the luminance signals Y(A) and Y(B) are output as focus detection signals, but a configuration in which only the luminance signal Y(A) is output from the output portion 106 may be adopted. Specifically, an image capture signal, that is, the pixel signal S(A+B), is output from the image capture signal processor 701. Thus, the focus detection signal may be obtained by calculating the luminance signal Y(A+B) from the pixel signal S(A+B) in the phase difference detection portion 108 or the like after the pixel signal S(A+B) has been output to outside of the image sensor 100, and subtracting the luminance signal Y(A) to calculate the luminance signal Y(B). The signal transmission amount can thus be further reduced, by outputting only the luminance signal Y(A) from the focus detection signal processor 702.

For example, if a signal processor is not provided, in the case where the pixel count is 20 megapixels, pixel signals S(A) and S(B) for all the pixels, that is, 40 million pieces of data, need to be output. On the other hand, in the case where the Y value is calculated and output as the focus detection signal by an image sensor that is provided with the signal processor of the present embodiment, 20 million pieces of data for image capture and 5 million pieces of data for focus detection (20 million/4) will be output, evidently reducing the signal transmission amount. As a result, high-speed readout becomes possible. Also, in the case where the focus detection signal is a correlation operation value, the signal transmission amount is clearly further reduced.

In the timing chart of FIG. 6, it is also possible to obtain signals of the unit pixels 200 in which the charge of the photoelectric conversion portion 201A and the charge of the photoelectric conversion portion 201B are combined by simultaneously controlling the control signals PTXA and PTXB at times t607 and t608. Specifically, it is possible to obtain the pixel signal S(A+B), if signal readout is performed by controlling the control signals PTXA and PTXB so as to change to Hi and Lo at the same time, after reading out the signal of the photoelectric conversion portion 201A, in accordance with the timing chart of FIG. 6. In this case, since readout of the reset signal decreases by one, even faster readout becomes possible.

In the case where the pixel signals S(A) and S(A+B) are read out from the pixels, the pixel signal S(B) can be obtained, if processing for subtracting the pixel signal S(A) from the pixel signal S(A+B) is performed in the focus detection signal processor 702. Alternatively, the focus detection processing portion 702 may process and output only the pixel signal S(A), and the pixel signal S(B) or the luminance signal Y(B) may be calculated in the phase difference detection portion 108.

Second Embodiment

Next, a second embodiment of the present invention will be described. In the first embodiment, output of focus detection signals was performed in the entire area of the pixel portion, but if the signals of only required areas are selected and output with regard to the focus detection signals, a further increase in processing speed can be realized.

Figure 8A:
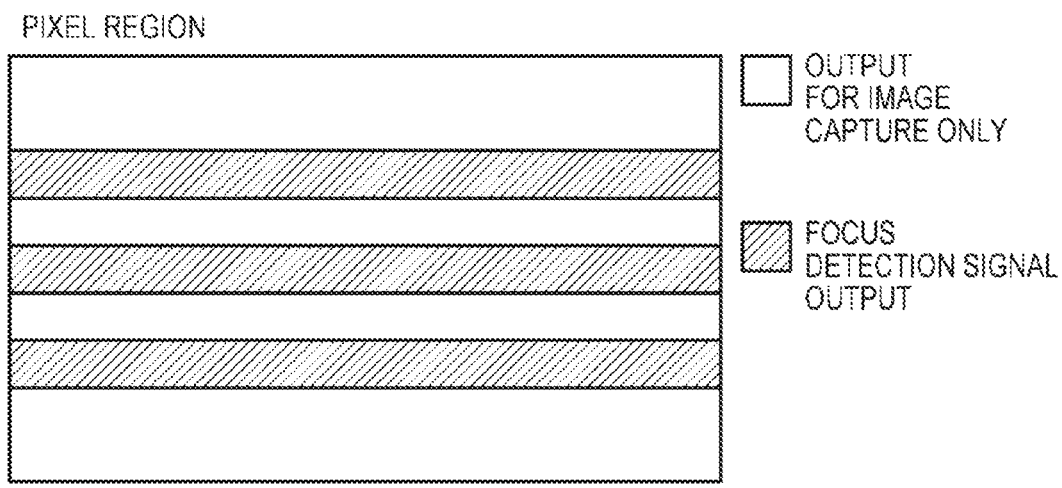
FIG. 8A is a diagram showing focus detection signal output areas in a pixel area of a second embodiment.
Figure 8B:
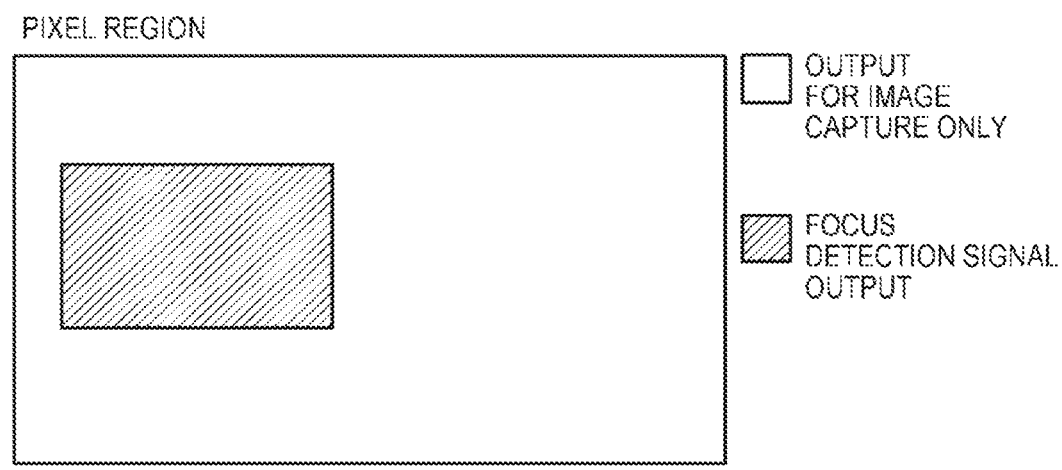
FIG. 8B is a diagram showing focus detection signal output areas in a pixel area of a second embodiment.

FIGS. 8A and 8B are diagrams showing an exemplary output area of focus detection signals in a pixel area. Focus detection signals and image capture signals are output from the shaded areas, and only image capture signals are output from the other areas. For example, focus detection signals of only target areas are discretely (selectively) output over a wide range of pixels, as in the example shown in FIG. 8A. It thereby becomes possible to obtain focus detection information on the entire pixel area, while suppressing the amount of signals that are output to outside of the image sensor 100. In the case of the example shown in FIG. 8B, it becomes possible to obtain detailed focus detection information about a partial area, and also to suppress the amount of signals that are output to outside of the image sensor 100. Selection of these areas in which to perform output is controlled by the controller 104. The focus detection signal processor 702 reads out only signals of the output target areas from memory and performs computational operations on the read signals.

Note that the output of the focus detection signals in partial areas such as is shown in FIGS. 8A and 8B may be Y value signals or correlation operation results, but may also be pixel signals S(A). Although the amount of signals that are transmitted increases compared with Y value signals or correlation operation results, suppression of the signal transmission amount is achieved, since output is performed from only required areas. Also, this is realizable even with a comparatively small-scale signal processing circuit.

Note that processing for combining and averaging focus detection signals may also be performed in the focus detection signal processor 702. In this case, processing for combining and averaging is performed on pixel signals S(A) and on pixel signals S(B).

As described above, signal processing for outputting only required signals to outside of the image sensor 100 is performed in the image sensor 100 that is provided with the image capture signal processor 701 and the focus detection signal processor 702. The transmission amount of focus detection signals can thereby be reduced, and image capture data and focus detection information can both be obtained at high speed and efficiently.

Note that there is a method of shortening the readout time of one frame, by thus limiting the pixels to be used in focus detection. Normally, an increase in the readout time is suppressed by respectively outputting the signals of two photoelectric conversion portions within the unit pixels in only rows that are used in focus detection processing, and combining the signals of the two photoelectric conversion portions and outputting only image generation signals in rows that are not used in focus detection processing. In this case, it is possible to combine the individual output signals of the two photoelectric conversion portions output as focus detection signals and use the combined signals as pixel image capture signals. However, a problem arises in that a difference occurs in noise level and the like due to the signal readout method and the method of combining the output signals of the two photoelectric conversion portions differing depending on whether or not the row will be used in focus detection processing, resulting in a deterioration in the captured image that is obtained. However, by providing a focus detection signal processor as in the present embodiment, the signals from the pixel portion are all read out at a similar readout timing, and pixels to be output by the focus detection signal processor 702 can be selected. Thus, the noise amount of the pixel signals S(A+B) that are used in image capture does not change depending on the area, enabling high quality captured images to be obtained.

Third Embodiment

Next, a third embodiment of the present invention will be described. In the second embodiment, an example was described in which the focus detection signal processor 702 selects and outputs only signals of a required output target area among the focus detection signals. In the present embodiment, in further pursuit of this approach, an example will be described in which the required area among the focus detection signals is set based on a user input or the area of a subject detected by a subject detection portion.

Figure 9:
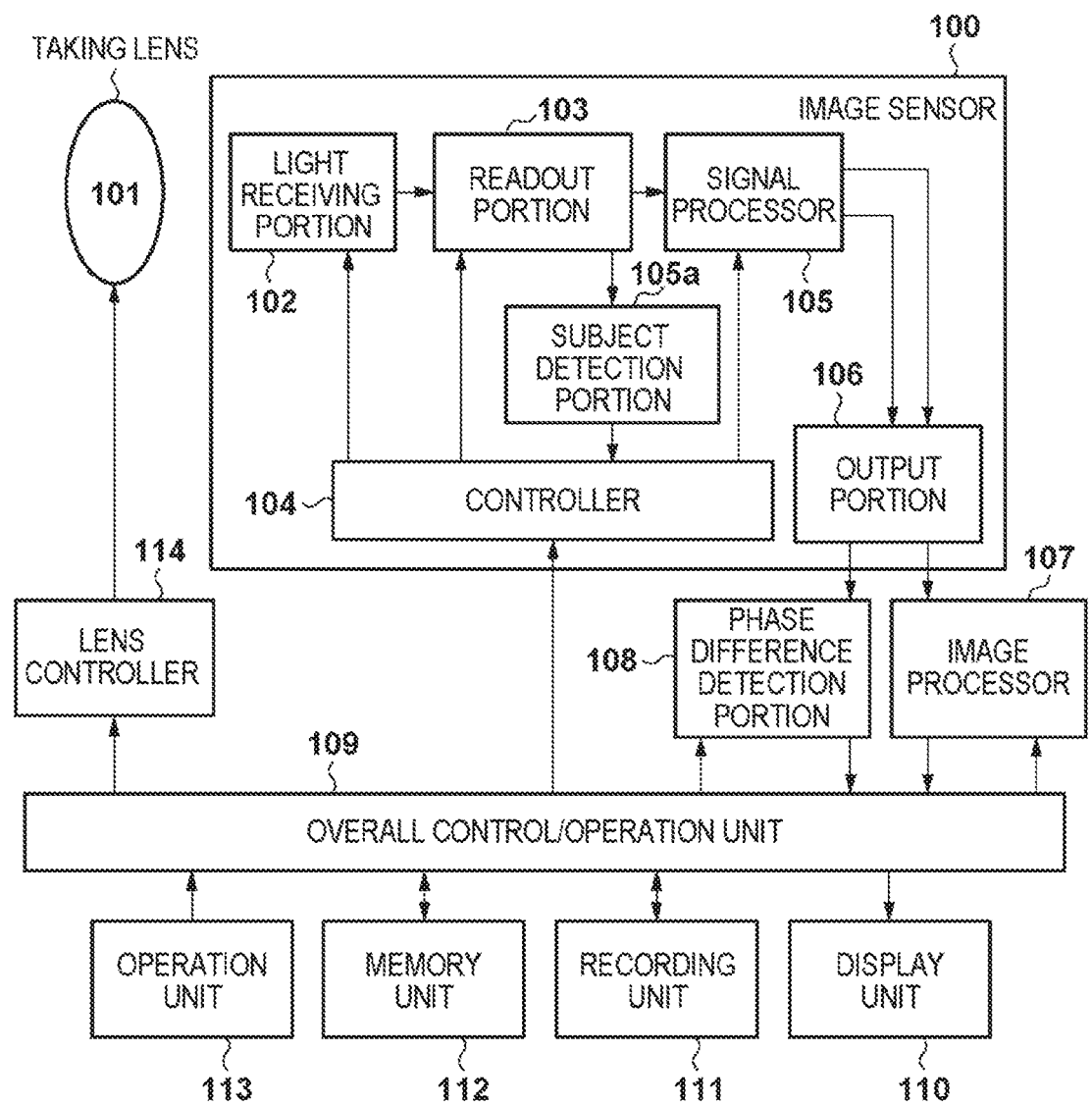
FIG. 9 is a block diagram showing the configuration of an image capturing apparatus according to a third embodiment of the present invention.

The configuration of an image capturing apparatus of the present embodiment is, as shown in FIG. 9, the configuration of the image capturing apparatus of the first and second embodiments shown in FIG. 1 to which a subject detection portion 105a has been added. The remaining configuration is similar to the configuration of FIG. 1, and thus description of portions that are the same is omitted and only portions that are different will be described.

In FIG. 9, the subject detection portion 105a, on receipt of digital signal output for image generation from the readout portion 103, detects a subject using a well-known pattern recognition processing circuit, and determines a focus detection area for performing focus detection processing. A physical feature such as the face or eyes of a person or an animal, for example, are given here as a subject that is detected. Also, the subject detection portion 105a may be provided internally with a memory that temporarily stores image generation signals, in order to perform subject detection processing.

The signal processor 105 has an image capture signal processor 701 and a focus detection signal processor 702, as already described using FIG. 7 in the first embodiment. The operations of the image capture signal processor 701 are similar to the first embodiment.

On the other hand, in the focus detection signal processor 702, similarly to the second embodiment, a required area among of the digital signal output for focus detection is selected and output to the output portion 106. In the case where the focus detection area is set manually, however, the focus detection signal processor 702 selectively outputs focus detection signals of a focus detection area arbitrarily selected by the user. Alternatively, in the case where the focus detection area is set automatically, the focus detection signal processor 702, on receipt of a subject detection result of the subject detection portion 105a, selectively outputs focus detection signals of the area in which a subject is detected. The output portion 106 outputs digital signals for image generation received from the image capture signal processor 701 and digital signals for focus detection received from the focus detection signal processor 702 to outside of the image sensor 100.

The phase difference detection portion 108, on receipt of a digital signal for focus detection from the output portion 106, calculates a phase difference evaluation value for performing focus detection employing a phase difference detection method. In the present embodiment, the focus detection signal that is input to the phase difference detection portion 108 is a signal that the focus detection signal processor 702 within the signal processor 105 provided inside the image sensor 100 outputs after selecting an area. Accordingly, because the focus detection signal that the output portion 106 of the image sensor 100 transmits to the phase difference detection portion 108 is only a signal required for focus detection control, the transmission band is efficiently used. Furthermore computational operation processing for phase difference evaluation value calculation in areas that will not be required in focus detection control and processing for extracting signals that will ultimately be required in focus detection control are also not required in the internal processing of the phase difference detection portion 108. Accordingly, the phase difference detection portion 108 is able to increase the processing speed at which the phase difference evaluation value is calculated. Furthermore, the scale of processing circuitry of the phase difference detection portion 108 can also be reduced.

Note that the display unit 110 in FIG. 9 is used not only to display image signals received from the overall control/operation unit 109 but also to display focus detection areas that the user of the image capturing apparatus is able to arbitrarily select. The display unit 110 is also used in order to display the subject area, which is the area in which the subject detected by the subject detection portion 105a exists. Also, the operation unit 113 is used for various types of inputs, but is used also in order for the user of the image capturing apparatus to set an arbitrary focus detection area. If the display unit 110 is a touch panel, however, input operations of the operation unit 113 may be substituted for touch operations on the display unit 110.

Figure 10:
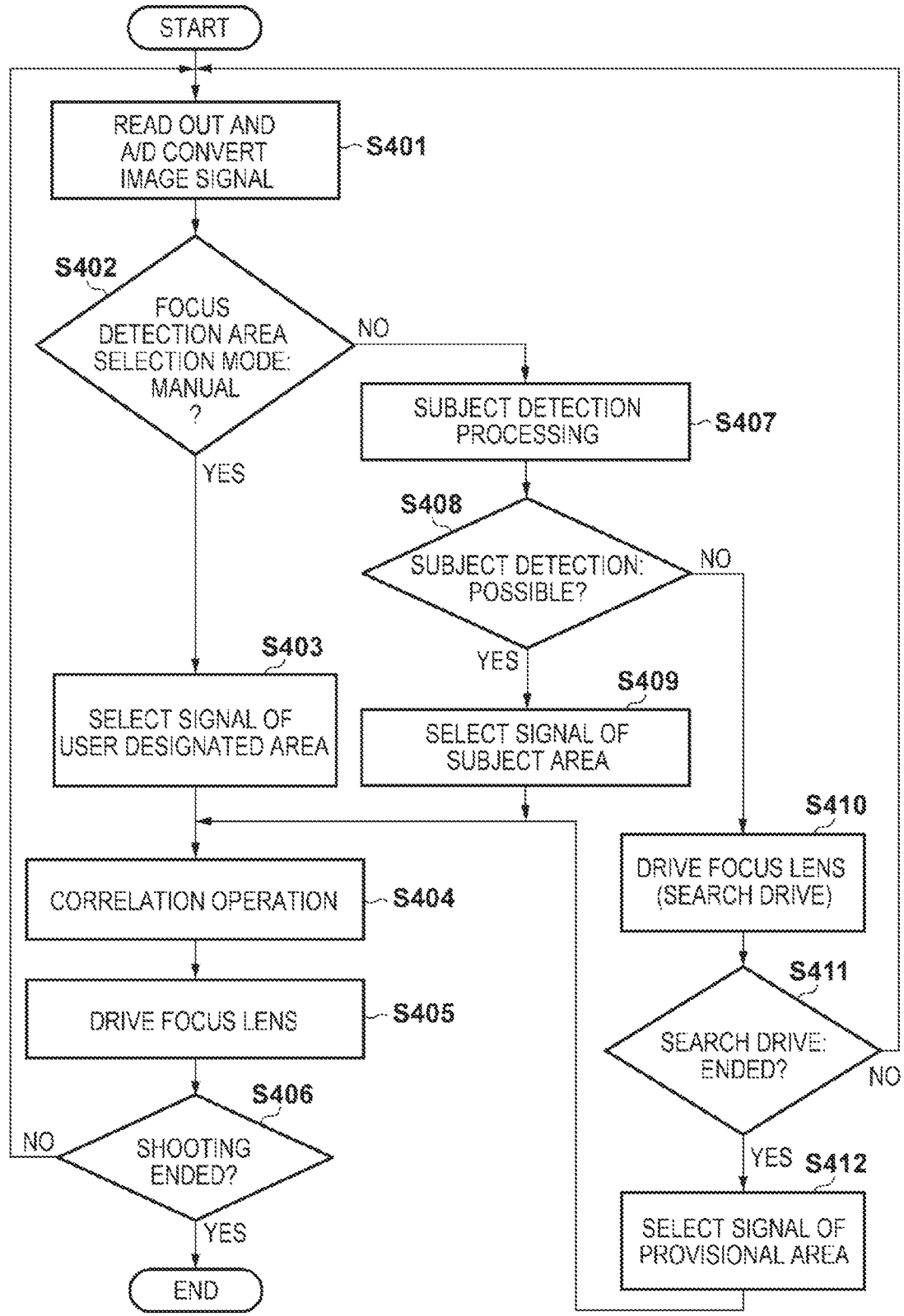
FIG. 10 is a flowchart showing the flow of processing for image capture plane phase difference AF in the third embodiment.

Next, FIG. 10 is a flowchart showing the flow of processing for image capture plane phase difference AF in the present embodiment. When processing for image capture plane phase difference AF is started, first, in step S401, the pixel portion 401 of the image sensor 100 is driven, and the signals (focus detection signals) of the plurality of PDs that are included in the unit pixels 200 of the entire area of the pixel portion 401 are individually read. At this time, the drive circuit portion 402 may drive the pixel portion 401 with a readout scanning method such as row thinning readout, row addition readout, row portion readout, column thinning readout, column addition readout, and column portion readout, according to a required frame rate. As aforementioned above, however, the drive circuit portion 402 drives the pixel portion 401 uniformly under the same conditions, and thus problems such as crosstalk and blooming tending to occur do not arise.

Thereafter, the signal of each PD undergoes A/D conversion in the readout portion 103, and a digital signal for focus detection is obtained. Furthermore, the readout portion 103 is also able to generate image generation signals by combining the digital signals of the plurality of PDs for every unit pixel 200.

The focus detection signals and the image generation signals of the entire area of the pixel portion 401 are output to the signal processor 105 from the readout portion 103. The image generation signals are output to outside of the image sensor 100 from the output portion 106 via the signal processor 105, and are processed by the image processor 107. Thereafter, a generated image is displayed on the display unit 110 by the overall control/operation unit 109. A moving image is continuously displayed on the display unit 110, as a result of image generation signals being continuously output from the image sensor 100 at a predetermined frame rate.

Figure 11:
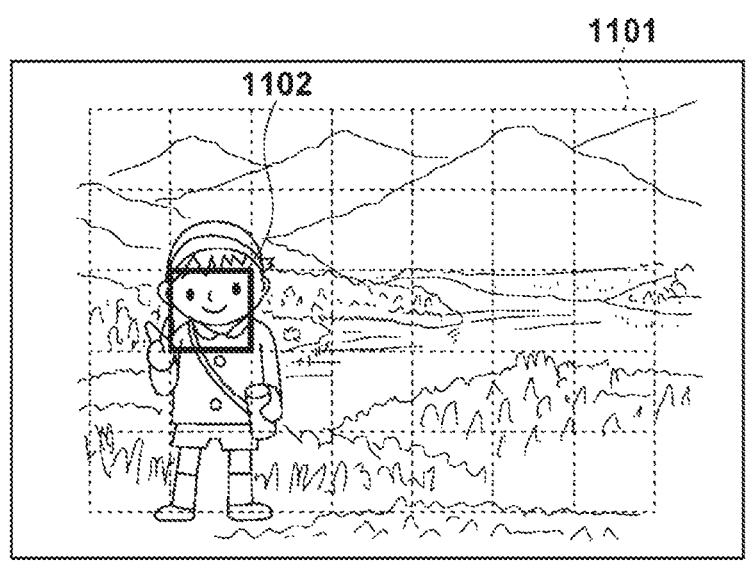
FIG. 11 is a diagram showing a screen for selecting a focus detection area in the third embodiment.

Next, in step S402, the mode for selecting a focus detection area is confirmed. Here, in the case where the focus detection area has been manually set in advance, in order for the user to focus the taking lens 101 on an arbitrary area, the processing transitions to step S403. An exemplary operation screen that is displayed on the display unit 110 when the user selects a focus detection area in this case is shown in FIG. 11. As shown in FIG. 11, a plurality of focus detection areas 1101 that can be selected are displayed on the operation screen. Here, a 7:5 (width:height) detection frame is shown, but the detection frame may be divided into smaller areas or larger areas. Also, rather than selecting from a predetermined detection frame, the user may designate an arbitrary position from the entire shot screen. The user selects an area 1102 that includes a person's face, for example, as the area on which to focus. Position information on the focus detection area 1102 selected by the user is input to the signal processor 105 from the operation unit 113, via the overall control/operation unit 109.

Next, in step S403, the focus detection signal processor 702 within the signal processor 105 selects the focus detection signals of the area designated by the user, among the focus detection signals of the entire area of the pixel portion 401 that are output to the signal processor 105 from the readout portion 103 at step S401. The focus detection signals selected by the focus detection signal processor 702 are input to the phase difference detection portion 108, via the output portion 106. At this time, in the present embodiment, high-speed transmission is possible, because the focus detection signals that are transmitted to the phase difference detection portion 108 by the output portion 106 are only signals required for focus detection control, that is, only focus detection signals of the area designated by the user.

Next, at step S404, the phase difference detection portion 108, on receipt of the digital signals for focus detection from the output portion 106, calculates a phase difference evaluation value for performing focus detection employing a phase difference detection method. At this time, the phase difference detection portion 108 is not required to perform computational operation processing for phase difference evaluation value calculation in areas that will not be required in focus detection control or processing for extracting signals that will ultimately be required in focus detection control. Accordingly, focus detection control can be performed at high speed.

Next, in step S405, based on the phase difference evaluation value calculated by the phase difference detection portion 108, the lens controller 114 calculates optical system drive information and controls the focus lens position of the taking lens 101.

Next, in step S406, it is checked whether the image capturing apparatus should end shooting. If a shooting end operation is input by the user from the operation unit 113, shooting is directly ended. If a shooting end operation is not input by the user from the operation unit 113, the processing transitions to step S401, and shooting and image capture plane phase difference AF processing are continued.

On the other hand, in the case where, in step S402, settings have been configured such that the area on which to focus the taking lens 101 is automatically determined by the image capturing apparatus, the processing transitions to step S407. In step S407, the subject detection portion 105a, on receipt of the image generation signal from the readout portion 103, performs subject detection processing for automatically determining the area on which to focus the taking lens 101. The subject to be detected is, for example, the face or eyes of a person or an animal. Various well-known pattern recognition processing can be applied as the method of subject detection processing. A technique called template matching or deep learning, for example, is given as a typical pattern recognition technique.

Figure 12A:
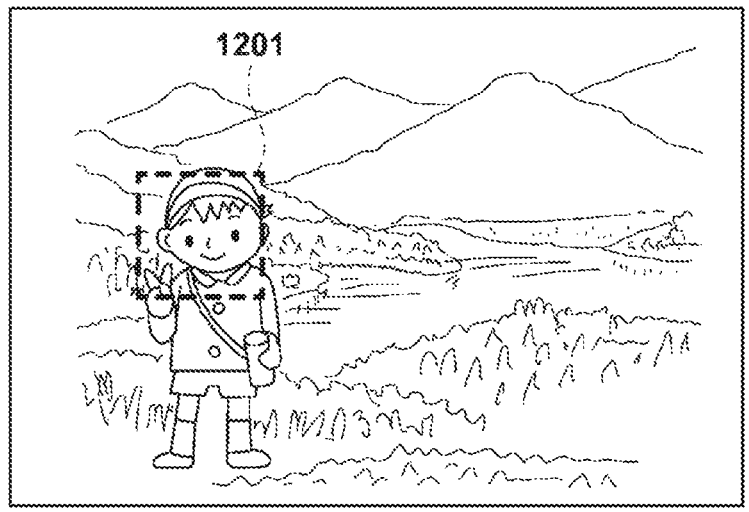
FIG. 12A is a diagram showing a subject detection result screen in the third embodiment.

An exemplary screen that is displayed on the display unit 110, in order to show the detected subject area detected by the subject detection portion 105a is shown in FIG. 12A. As shown in FIG. 12A, a subject area 1201 detected by the subject detection portion 105a as an area that includes a person's face is displayed. The subject detection portion 105a outputs horizontal/vertical address information of the detected subject area 1201 within the image to the signal processor 105. The signal processor 105 outputs horizontal/vertical address information of the subject area 1201 within the image to the overall control/operation unit 109 via the output portion 106, in order to display the horizontal/vertical address information as a subject area on the display unit 110. The overall control/operation unit 109 composes the subject area information with the generated image processed by the image processor 107, and displays the composite image on the display unit 110. Also, as will be discussed in detail later, the signal processor 105 uses the horizontal/vertical address information of the subject area 1201 within the image in order to select a focus detection signal.

Figure 12B:
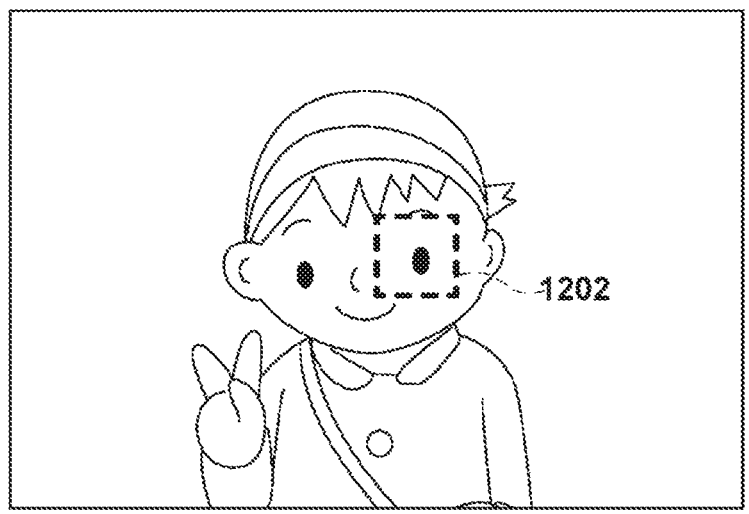
FIG. 12B is a diagram showing a subject detection result screen in the third embodiment.

Also, the case where a person's face is framed in close-up is shown in FIG. 12B as another example of a subject detection result. In an example such as FIG. 12B, the area including the person's face is large, and thus if the focus detection signals in an area over a wide range that includes the entire face were output to the downstream phase difference detection portion 108, the communication time would be long, and this would serve as an impediment to high-speed focus detection control. Accordingly, as shown in FIG. 12B, in the case where a person's face is detected in close-up, preferably the subject detection portion 105a further extracts a characteristic portion (e.g., eyes) of the face, and sets the extracted portion as a subject detection area 1202. This is realized, for example, by detecting the case where the pixel count of the area in which the subject detection portion 105a detected the face exceeds a predetermined pixel count, and performing control so as to switch the subject detection target.

Next, in step S408, the detection result of the subject detection portion 105a in step S407 is confirmed. If a subject was detected in step S407, the processing transitions to step S409.

In step S409, the signal processor 105 selects the focus detection signals of the area detected by the subject detection portion 105a, among the focus detection signals read out from the entire area of the pixel portion 401. The focus detection signals selectively output from the signal processor 105 are input to the phase difference detection portion 108 via the output portion 106. In this case, in the present embodiment, the focus detection signals that are transmitted to the phase difference detection portion 108 by the output portion 106 are only signals of the area required for focus detection control, and can thus be transmitted at high speed.

Next, in step S404, the phase difference detection portion 108, on receipt of the digital signals for focus detection from the output portion 106, calculates a phase difference evaluation value for performing focus detection employing a phase difference detection method. In this case, the phase difference detection portion 108 is not required to perform computational operation processing for phase difference evaluation value calculation in areas that will not be required in focus detection control or processing for extracting signals that will ultimately be required in focus detection control. Accordingly, focus detection control can be performed at high speed. Subsequently, processing that has already been described is executed in steps S405 and S406.

On the other hand, if it is confirmed in step S408 that a subject was not detected in step S407, the processing transitions to step S410.

In step S410, the lens controller 114 performs control so as to search drive the focus lens of the taking lens 101 by a predetermined amount. Furthermore, in step S411, the focus lens position of the taking lens 101 is checked, and it is determined whether the search drive has ended. Here, if the search drive is in progress, the processing transitions to step S401. Accordingly, if the setting in step S402 is to automatically determine the focus detection area, and a state in which the subject detection portion 105a is not able to detect a subject in step S407 continues, the search drive of the focus lens is continued. If, in step S411, the search drive from the infinity end to the close end has ended, however, the processing transitions to step S412.

In step S412, processing in the case where the subject detection portion 105a is not able to detect a subject in step S407, even when the lens controller 114 repeats the operation for search driving the focus lens in step S410, is performed. Here, in order to provisionally determine the focus lens position of the taking lens 101, the signal processor 105 selects the focus detection signals of a provisional area, among the focus detection signals read out from the entire area of the pixel portion 401. The focus detection signals selectively output from the signal processor 105 are input to the phase difference detection portion 108, via the output portion 106.

Next, in step S404, the phase difference detection portion 108, on receipt of the digital signals for focus detection from the output portion 106, calculates a phase difference evaluation value for performing focus detection employing a phase difference detection method. Subsequently, processing that has already been described is executed in steps S405 and S406.

As described above, in the present embodiment, the focus detection signals that are transmitted to the phase difference detection portion 108 by the output portion 106 of the image sensor 100 are only signals required for focus detection control, and thus high-speed transmission is possible. The phase difference detection portion 108 is not required to perform computational operation processing for phase difference evaluation value calculation in areas that will not be required in focus detection control or processing for extracting signals that will ultimately be required in focus detection control. Accordingly, the phase difference detection portion 108 is able to increase the processing speed at which the phase difference evaluation value is calculated. Therefore, focus detection control by image capture plane phase difference AF can be performed at high speed.

Fourth Embodiment

Figure 13:
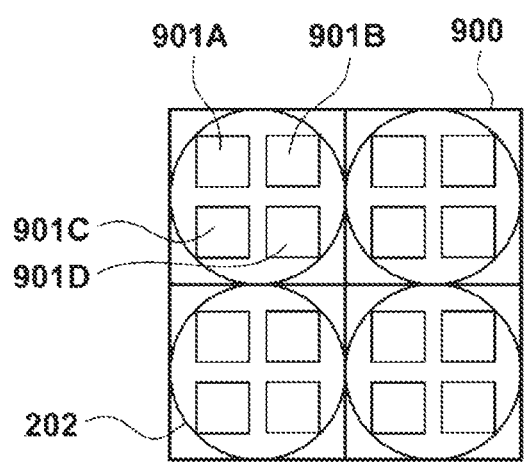
FIG. 13 is a diagram illustrating the configuration of an image sensor of a fourth embodiment.

Next, a fourth embodiment of the present invention will be described. In the fourth embodiment, the configuration of the unit pixels 200 of the pixel portion 402 is different. FIG. 13 is a diagram in which the light receiving portion 102 and micro lens array of the image sensor 100 are observed from the optical axis direction (Z direction). Four photoelectric conversion portions 901A, 901B, 901C and 901D are disposed with respect to one micro lens 202. By thus having a total of four photoelectric conversion portions composed of two each in the X-axis direction and the Y-axis direction, the light that has passed through an exit pupil area divided in four can be respectively received. The signal readout method and the processing by the signal processor 105 in an image sensor 100 that is constituted by a pixel portion 401 in which such unit pixels are each provided with four photoelectric conversion portions will be described.

Figure 14:
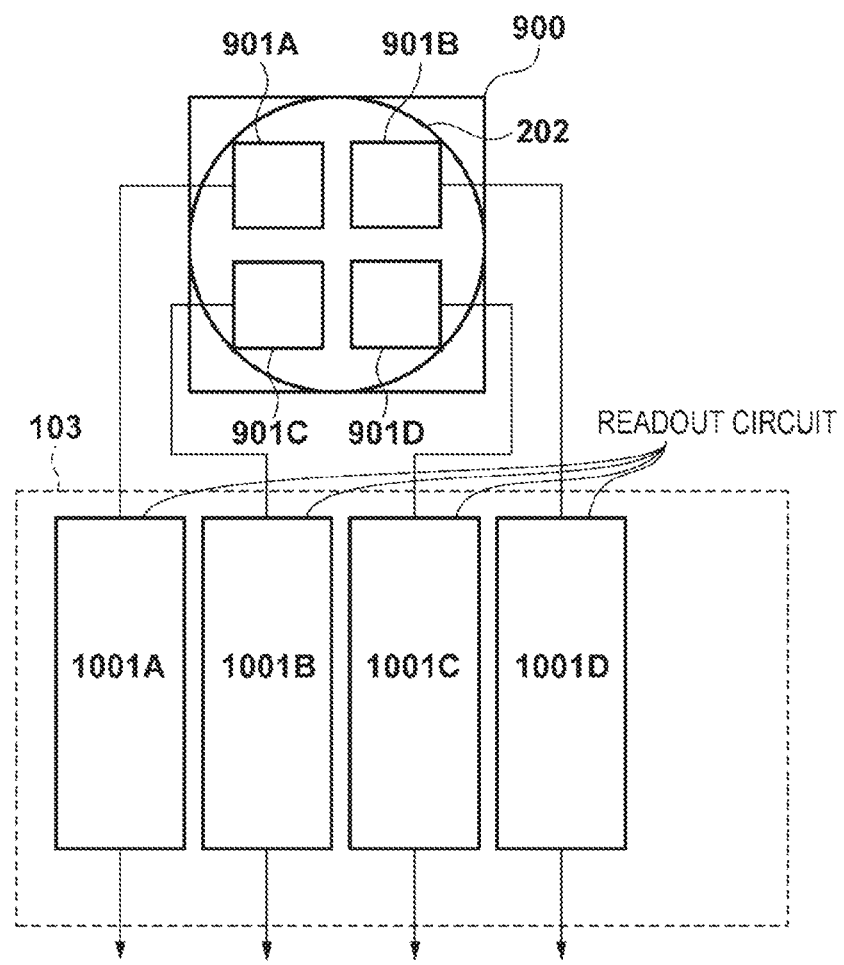
FIG. 14 is a diagram illustrating a pixel circuit and readout circuits of the image sensor of the fourth embodiment.

FIG. 14 is a schematic diagram showing an example of the configurations of a unit pixel 900 and the readout portion 103. The configuration in FIG. 14 is provided with readout circuits each corresponding to a different one of photoelectric conversion portions. That is, the pixel signal of a photoelectric conversion portion 901A is output to a readout circuit 1001A. Hereinafter, similarly, the pixel signals of photoelectric conversion portions 901B to 901D are respectively output to readout circuits 1001B to 1001D. Since the signal readout operation from the photoelectric conversion portions can be implemented with a method that is substantially similar to the drive method described in FIGS. 5 and 6, description thereof is omitted.

Processing by the signal processor 105 on the signals read out from each photoelectric conversion portion will be described. The image capture signal processor 701 calculates image capture signals from signals that have been read out. That is, the image capture signal processor 701, on receipt of pixel signals S(A), S(B), S(C) and S(D) of the plurality of photoelectric conversion portions 901A, 901B, 901C and 901D of the unit pixel 900, performs combination processing and calculates a pixel signal S(A+B+C+D). The pixel signal S(A+B+C+D) is then sent to the output portion 106 via the image capture signal output line 703. The image capture signal processor 701 is able to reduce the amount of signal transmission to outside of the image sensor 100, by combining the signals of the plurality of photoelectric conversion portions and outputting the combined signals to outside of the image sensor 100 from the output portion 106. In an image sensor that is provided with four photoelectric conversion portions, as with the unit pixel 900, this effect is further enhanced.

Next, processing by the focus detection signal processor 702 will be described. In the case of an image sensor that is provided with four photoelectric conversion portions per unit pixel 900 as shown in FIG. 13, the signals of the four photoelectric conversion portions need to be individually output in order to perform focus detection, and thus the signal transmission amount is considerable, which is not desirable in terms of high-speed readout. As described in the first embodiment, it is preferable to calculate and output Y values or to output only correlation operation results. If the signals of only required areas are output, the signal transmission amount can be further reduced.

In the case of a configuration in which the unit pixel 900 is provided with 2×2 photoelectric conversion portions as shown in FIG. 13, phase difference detection can also be performed in the up-down direction, in addition to the right-left direction. For example, the pixel signals S(A) and S(C) are combined and output, and the pixel signals S(B) and S(D) are combined and output. In this case, focus detection employing a phase difference method in which pupil division is performed in the right-left direction from obtained focus detection signals becomes possible. Also, in the case the pixel signals S(A) and S(B) are combined and output and the pixel signals S(C) and S(D) are combined and output, focus detection employing a phase difference method in which pupil division is performed in the up-down direction from obtained focus detection signals becomes possible. By switching and outputting these signals according to the subject, accurate focus detection can be performed on respective subjects in vertical bands and horizontal bands. Also, the output pattern may be changed depending on the pixel area.

Furthermore, the focus detection signal processor 702 may perform a correlation operation using the combined signals that are obtained (e.g., S(A+C) and S(B+D)), and output only the result thereof. If correlation operation processing is performed in the focus detection signal processor 702, the signal transmission amount that is output from the image sensor 100 can be reduced. Also, the signal transmission amount can be suppressed, even when correlation operations in both the left-right direction and the up-down direction are performed in the same area and the results thereof are output.

In an image sensor provided with multi-division pixels, by thus providing the focus detection signal processor 702 within the image sensor, an increase in the amount of signals that are output from the image sensor can be suppressed, and image capture data and focus detection information can be obtained at high speed. Furthermore, since phase difference information can be acquired in the right-left direction and the up-down direction, focus detection can be accuracy performed. Although, in the present embodiment, an image sensor having four photoelectric conversion portions per unit pixel was described as an example, a configuration having more photoelectric conversion portions may be adopted. In order to add more parallax, only required PD signals may be output, or signals may be diagonally combined and output.

Fifth Embodiment

Since the signal processor 105 of an image sensor 100 such as described in the first to third embodiments has large-scale circuitry, there is a high possibility that the area of the image sensor 100 will be large. In view of this, in the present embodiment, the configuration of an image sensor 100 that suppresses an increase in area will be described.

Figure 15:
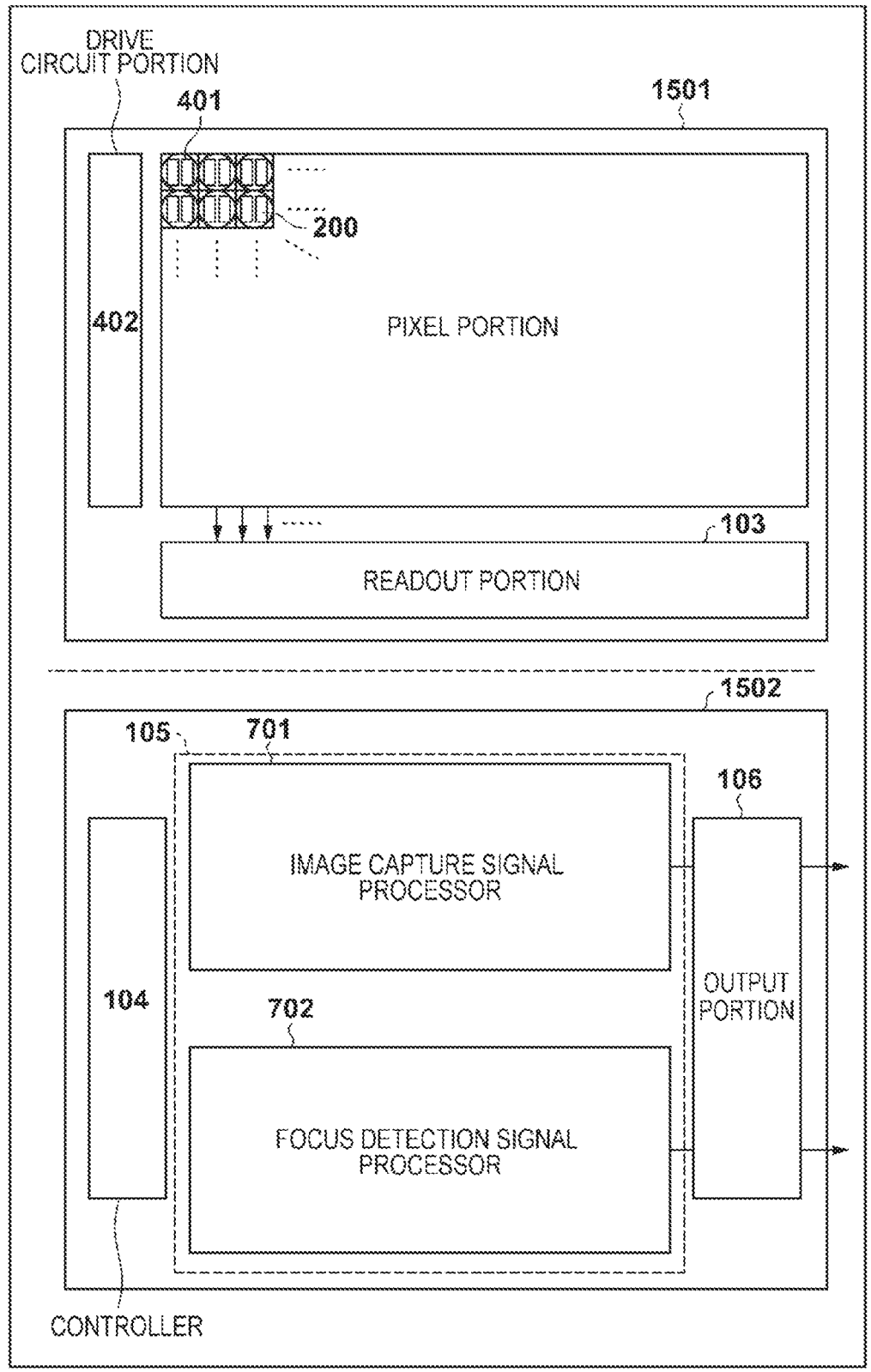
FIG. 15 is an overall configuration diagram of an image sensor of a fifth embodiment.
Figure 16:
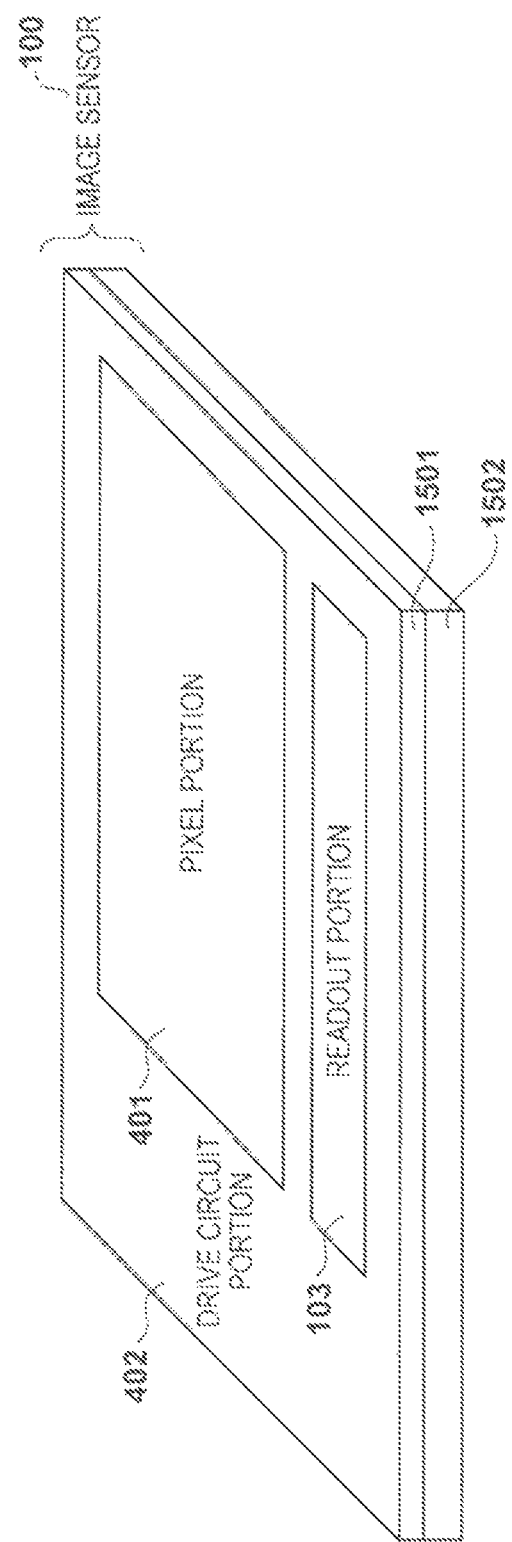
FIG. 16 is an overall configuration diagram of the image sensor of the fifth embodiment.

FIGS. 15 and 16 are configuration diagrams of an image sensor 100 in the fifth embodiment. The image sensor of the present embodiment has a configuration (multilayer structure) in which a pixel area chip 1501 and a signal processing chip 1502 are stacked. The wirings between semiconductor chips (semiconductor substrates) are electrically connected using micro bumps or the like, by a well-known substrate stacking technique.

A pixel area chip 1501 is provided with a pixel portion 401 in which unit pixels 200 each provided with a plurality of photoelectric conversion portions are arrayed in a matrix, a drive circuit portion 402, and a readout portion 103. The drive circuit portion 402 sends drive signals to the pixels of the pixel portion 401. Note that, in FIG. 15, the unit pixels 200 have two photoelectric conversion portions, but the number of photoelectric conversion portions is not limited thereto.

The readout portion 103 is configured to be provided with one readout circuit 509 per pixel column, for example, and reads out pixel signals of the pixel portion 401. Vertical and horizontal selection of read pixel signals is performed under the control of the drive circuit portion 402, and selected signals are sequentially transferred to the signal processor 105.

A signal processing chip 1502 is provided with a controller 104, a signal processor 105, and an output portion 106. The signal processor 105 has an image capture signal processor 701, and a focus detection signal processor 702, and functions to process pixel signals read out from the readout portion 103 and output the processed pixel signals to outside of the image sensor 100 via the output portion 106. Since the signal processing in the signal processor 105 is similar to the processing described in the first to third embodiments, description thereof is omitted. The image sensor 100 has a configuration in which the pixel area chip 1501 and the signal processing chip 1502 are integrally formed by being stacked, as shown in FIG. 16.

As described above, by providing the image sensor with a stacked structure, sufficient area for the signal processor 105 can be secured, enabling large-scale circuitry to be mounted. In the signal processor 105, the signal transmission amount can be reduced by performing signal processing for outputting only required signals to outside of the image sensor 100, and it becomes possible to obtain both image capture data and focus detection information at high speed.

Sixth Embodiment

In an image sensor constituted by a pixel portion that is provided with a plurality of photoelectric conversion portions per unit pixel such as described in the first to third embodiments, a large number of the readout circuits 509 is preferable. For example, since pixel signals can be output at the same time for all pixels and A/D converted on a pixel-by-pixel basis in the case of adopting a configuration provided with one readout circuit per unit pixel, and further adopting a configuration provided with one readout circuit per photoelectric conversion portion, faster readout becomes possible. In this case, area is required in order to dispose the readout circuits, and thus an image sensor having a stacked structure is desirable.

Figure 17:
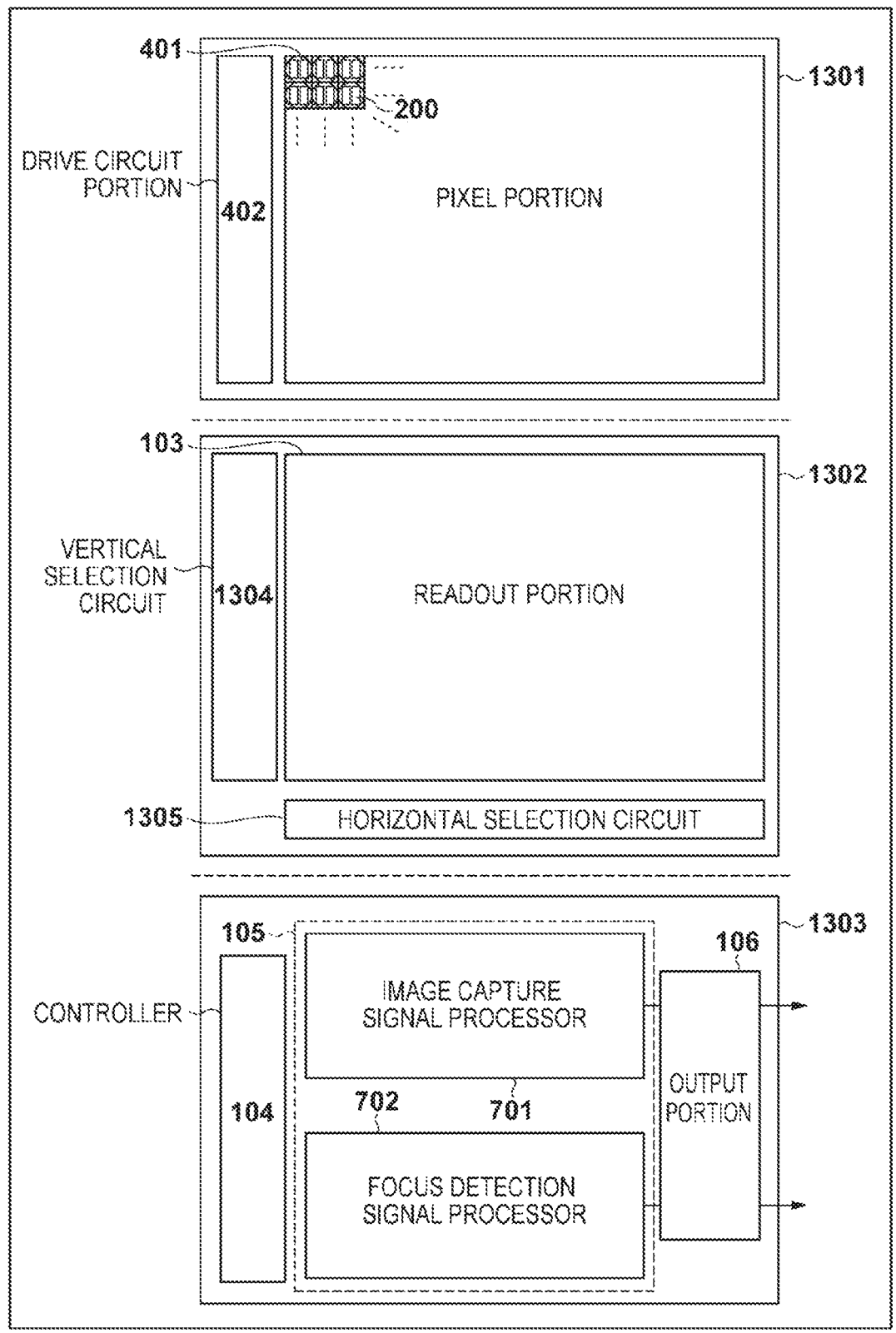
FIG. 17 is an overall configuration diagram of an image sensor of a sixth embodiment.

FIG. 17 is a diagram showing the configuration of an image sensor 100 in the sixth embodiment. The image sensor of the present embodiment has a configuration in which a pixel area chip 1301, a readout circuit chip 1302 and a signal processing chip 1303 are stacked. The wirings between the semiconductor chips (semiconductor substrates) are electrically connected using micro bumps or the like, by a well-known substrate stacking technique.

The pixel area chip 1301 is provided with a pixel portion 401 in which unit pixels 200 provided with a plurality of photoelectric conversion portions are arrayed in a matrix and a drive circuit portion 402. The drive circuit portion 402 sends drive signals to the pixels of the pixel portion 401. Note that, in FIG. 17, the unit pixels 200 have two photoelectric conversion portions, but the number of photoelectric conversion portions is not limited thereto.

The readout circuit chip 1302 is provided with a readout portion 103, a vertical selection circuit 1304, and a horizontal selection circuit 1305. The readout portion 103 has a large number of readout circuits 509 corresponding one-to-one with the unit pixels or the photoelectric conversion portions, and the pixel signals of the pixel portion 401 are output thereto. The pixel signals output to the readout circuit 509 are transferred to the signal processor 105 sequentially under the control of the vertical selection circuit 1304 and the horizontal selection circuit 1305.

The signal processing chip 1303 is provided with a controller 104, a signal processor 105, and an output portion 106. The signal processor 105 has an image capture signal processor 701 and a focus detection signal processor 702, and functions to process pixel signals read out by the readout portion 103 and output the processed pixel signals to outside of the image sensor 100 via the output portion 106. Since the signal processing in the signal processor 105 is similar to the processing described in the first to third embodiments, description thereof is omitted.

The image sensor 100 has a configuration in which the pixel area chip 1301, the readout circuit chip 1302 and the signal processing chip 1303 are integrally formed by being stacked. Incidentally, in the case of adopting a configuration in which one readout circuit is provided per photoelectric conversion portion, as with the configuration of the present embodiment, the time for the pixel signals to be output to the signal processor 105 is significantly reduced. For example, when the time taken for signal output by one photoelectric conversion portion is given as a, the time taken in order to read out the pixel signals of one frame will be α x number of rows, in the case of an image sensor that is provided with one readout circuit per column. On the other hand, in the case where one readout circuit is provided per photoelectric conversion portion, the pixel signals of one frame can be read out in a time of a. In this case, however, there is concern that the receipt of pixel signals and the signal processing in the signal processor 105 will determine the readout speed. However since the signal processor 105 of the image sensor 100 having a stacked structure, as in the present embodiment, can be arranged to have a large area, a large number of transmission lines of signals from the readout circuit chip 1302 can be provided, enabling pixel signals to be sent to the signal processor 105 at high speed. Also, since a large number of signal processing circuits can be mounted in the signal processor 105, parallel processing becomes possible, and signal processing time can also be reduced.

As described above, in the case where an image sensor has a stacked structure, sufficient area can be taken for the readout portion and the signal processor. As a result of the high-speed signal readout from the pixel portion of the image sensor of the present embodiment, and the signal processor 105 performing signal processing for outputting only required signals to outside of the image sensor, the signal transmission amount can be reduced, and both image capture data and focus detection information can be obtained at high speed.

Seventh Embodiment

Figure 18:
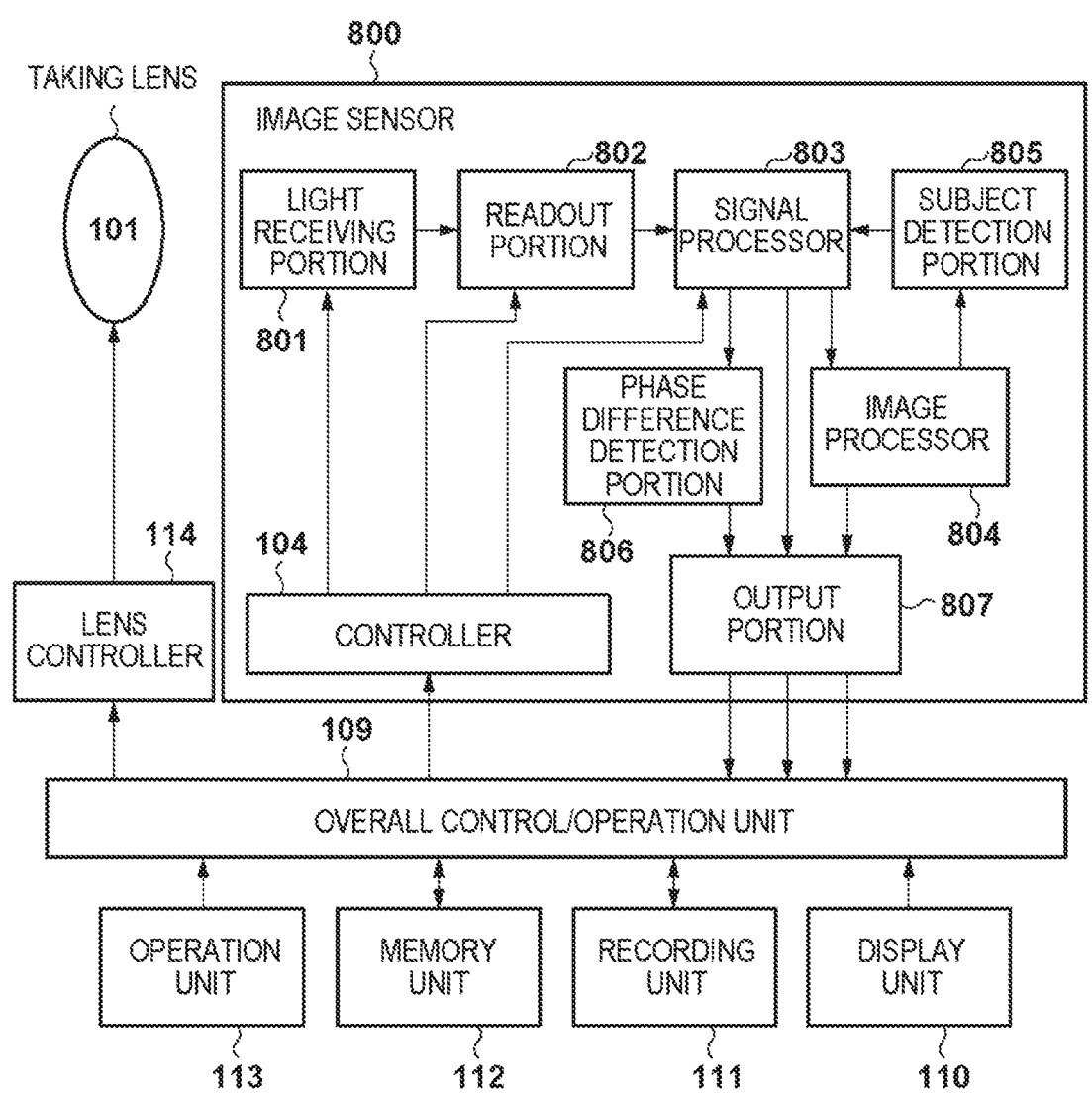
FIG. 18 is a block diagram showing the configuration of an image capturing apparatus according to a seventh embodiment.

FIG. 18 is a block diagram showing the configuration of an image capturing apparatus of a seventh embodiment of the present invention. In FIG. 18, constituent portions that are the same as the third embodiment will be given the same reference signs, and a detailed description is omitted.

In the seventh embodiment, the image capturing apparatus, when viewed as a whole, consists of the same constituent elements as the third embodiment, but the constituent elements internally included in an image sensor 800 differs from the third embodiment. The image sensor 800 of the seventh embodiment is configured to include a light receiving portion 801, a readout portion 802, a signal processor 803, an image processor 804, a subject detection portion 805, a phase difference detection portion 806, an output portion 807, and a controller 104.

The light receiving portion 801 receives the light of an optical image formed by the taking lens 101. In the light receiving portion 801, focus detection pixels each provided with a plurality of PDs under one micro lens are disposed, so as to each receive light beams that have passed through a divided exit pupil area of the taking lens 101. The readout portion 802 performs analog digital signal processing using an A/D conversion circuit, and adjustment (clamp processing) of a reference level.

The signal processor 803, on receipt of digital signal output from the readout portion 103, outputs signals to the phase difference detection portion 806 and the image processor 804 (discussed later). At this time, the signal processor 803, on receipt of the subject detection result of the subject detection portion 805, selectively outputs the focus detection signals of the subject detection area.

The image processor 804 performs image processing such as defective pixel correction, noise reduction, color conversion, white balance correction and gamma correction, resolution conversion processing, image compression processing, and the like on image generation signals received from the signal processor 803. The subject detection portion 805, on receipt of digital signal output from the image processor 804, determines the signal area for performing focus detection processing.

The phase difference detection portion 806 calculates a phase difference evaluation value for performing focus detection employing a phase difference detection method on focus detection signals received from the signal processor 803. The output portion 807 outputs phase difference evaluation values and digital signals for image generation that are received from the phase difference detection portion 806 and the image processor 804 to outside of the image sensor 800. Similar effects to the third embodiment are thus also obtained by the image sensor of the seventh embodiment of the present invention.

Incidentally, in image capture plane phase difference AF, one phase difference evaluation value is calculated by performing a correlation operation on the focus detection signals obtained from the plurality of PDs of the plurality of pixels. In the third embodiment, the output portion 106 output a plurality of digital signals for focus detection that are required in calculating this phase difference evaluation value to outside of the image sensor 100. On the other hand, in the case of the seventh embodiment, the output portion 807 outputs the phase difference evaluation value calculated by the phase difference detection portion 806 to outside of the image sensor 800. In other words, the amount of signals that are output to outside of the image sensor 800 is even less in the seventh embodiment than in the third embodiment. Accordingly, the output portion 807 of the image sensor 800 is able to transmit signals required in focus detection control in even less time than the third embodiment, and is able to perform focus detection control by image capture plane phase difference AF at high speed.

Also, with the image sensor 800 of the seventh embodiment, the subject detection portion 805 performs subject detection, using digital signals processed by the image processor 804. Thus, it is also possible to perform subject detection processing that also uses color information in addition to using signal subjected to defective pixel correction and noise reduction. Accordingly, the subject detection of the seventh embodiment can be performed with greater accuracy than the third embodiment.

Note that, with the seventh embodiment in the image sensor 800, even more constituent elements than the image sensor 100 of the third embodiment internally constitute the image sensor 800. Accordingly, the image sensor 800 is preferably a stacked image sensor, such as is shown in FIG. 16.

Eighth Embodiment

In the first to third embodiments, high-speed image capture plane phase difference AF was described as being possible as a result of the image sensor selectively outputting/transmitting focus detection signals. However, the applicable scope of the present invention is not limited to image capture plane phase difference AF, and the present invention can also be applied to automatic exposure control (image capture plane AE) that uses the signals of the image sensor. With image capture plane AE, specifically, control is performed after the image capturing apparatus has automatically determined the aperture of the taking lens, the accumulation time of the image sensor, the sensitivity (gain) of the image sensor, and the like. In the eighth embodiment of the present invention, the object is to perform faster image capture plane AE, as a result of the image sensor selectively outputting/transmitting signals to be used in image capture plane AE.

Figure 19:
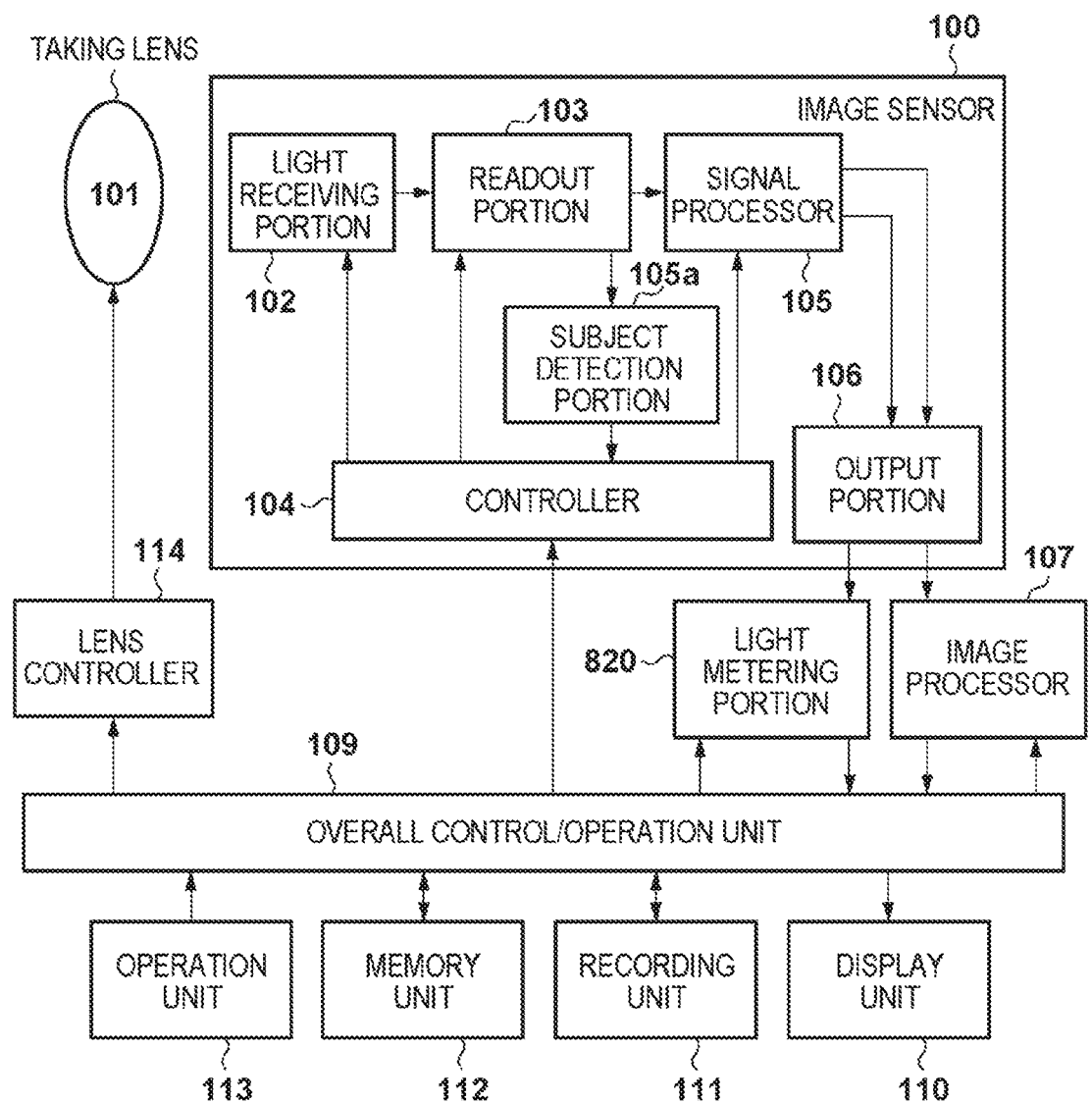
FIG. 19 is a block diagram showing the configuration of an image capturing apparatus according to an eighth embodiment.

FIG. 19 is a block diagram showing the configuration of an image capturing apparatus of the eighth embodiment of the present invention. In FIG. 19, the same reference signs are given to constituent portions that are same as the third embodiment, and a detailed description thereof is omitted. The present embodiment differs from the third embodiment in that the image capturing apparatus is provided with a light metering portion 820.

The signal processor 105, on receipt of digital signal output for image generation from the readout portion 103, outputs the signals to the output portion 106. The signal processor 105 selects digital signals for image generation to be used in image capture plane AE, according to a light metering method set in the image capturing apparatus. At this time, in the case of the so-called "spot metering method" and "partial metering method", for example, the signal processor 105 selects the signals of a partial area in the middle of the screen, for example. Also, in the case of the so-called "evaluation metering method", the signal processor 105 selects the signals of the entire screen. Selecting signals by row thinning or column thinning in a range in which the amount of signals required in calculation of a light metering evaluation value is obtained, however, rather than selecting the signals of all of the pixels of the entire screen, is preferable in order to perform faster image capture plane AE. Also, similarly to the third embodiment, a configuration may be adopted in which image generation signals of a focus detection area arbitrarily selected by the user and a subject area detected by the subject detection portion 105a are selected.

The light metering portion 820, on receipt of a digital signal for image generation from the output portion 106, calculates a light metering evaluation value for performing image capture plane AE. The digital signals for image generation that are input to the light metering portion 820 are the signals of an area selected by the signal processor 105 provided inside the image sensor 100. Accordingly, because the image generation signals for image capture plane AE that the output portion 106 of the image sensor 100 transmits to the light metering portion 820 are only signals required for exposure control, the communication band is used efficiently. Computational operation processing for light metering evaluation value calculation in areas that will not ultimately be required in image capture plane AE and processing for extracting signal that will ultimately be required are also not required in the internal processing of the light metering portion 820. Accordingly, the light metering portion 820 is able to increase the processing speed at which the light metering evaluation value is calculated.

The lens controller 114, on receipt of the output of the light metering evaluation value from the light metering portion 820, drives the diaphragm of the taking lens 101, based on the light metering evaluation value. Furthermore, the overall control/operation unit 109 drives the image sensor 100 based on the light metering evaluation value, and controls the accumulation time and sensitivity (gain) of the image sensor 100.

According to the eighth embodiment of the present invention, as described above, because the image generation signals that the output portion 106 of the image sensor 100 transmits to the light metering portion 820 are only signals required for image capture plane AE, high-speed transmission is possible. The light metering portion 820 is not required to perform computational operation processing for light metering evaluation value calculation that will not ultimately be required in image capture plane AE or processing for extracting signals that will ultimately be required. Accordingly, faster image capture plane AE can be performed.

Note that, in the pixels of the image sensor 100 of the eighth embodiment, it is not necessarily the case that a plurality of PDs are disposed per pixel as described in FIG. 2. As long as there are signals for image generation (i.e., signals obtained by combining the signals of a plurality of PDs under one micro lens on a pixel-by-pixel basis) in order to calculate the light metering evaluation value, a configuration in which there is one PD under every one micro lens may be adopted.

Although, in the eighth embodiment, a configuration that applies image capture plane AE on the basis of the configuration of the third embodiment was described, image capture plane AE can also be similarly applied on the basis of the configuration of the seventh embodiment. In this case, the image sensor 800 is configured by replacing the phase difference detection portion 806 in FIG. 18 with a light metering portion.

Although preferred embodiments have been described above, the present invention is not limited to these embodiments, and various modifications and changes that are within the spirit of the invention can be made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-183246 and 2015-183247, both filed Sep. 16, 2015 and 2016-144756, filed Jul. 22, 2016 which are hereby incorporated by reference herein in their entirety.

What is claimed is:

1. An image capturing apparatus comprising:
an image sensor; and
an image processor that processes signals output from the image sensor and generates an image,
wherein the image sensor includes:
a pixel portion in which a plurality of unit pixels each having one micro lens and a plurality of photoelectric conversion portions are arrayed in a matrix;
an image capture signal processor that performs signal processing for generating a captured image on signals output from the unit pixels of the pixel portion; and
a phase difference detection signal processor that performs signal processing for phase difference detection on signals output from the unit pixels of the pixel portion;
an output portion that outputs signals processed by the image capture signal processor or the phase difference detection signal processor outside of the image sensor; and
a controller that controls signal processing of the image capture signal processor and the phase difference detection signal processor.

2. The image capturing apparatus according to claim 1, further comprising a phase difference detector that performs phase difference detection.

3. The image capturing apparatus according to claim 1, wherein the controller controls the phase difference detection signal processor to select the signals of the unit pixels in a target area in the pixel portion, and output a signal of at least one photoelectric conversion portion among the plurality of photoelectric conversion portions of each of the unit pixels in the target area.

4. The image capturing apparatus according to claim 3, wherein the controller controls the phase difference detection signal processor to respectively output the signals of the plurality of photoelectric conversion portions of each of the unit pixels in the target area.

5. The image capturing apparatus according to claim 3, wherein the controller controls the phase difference detection signal processor to selectively combine and output the signals of the plurality of photoelectric conversion portions of each of the unit pixels in the target area.

6. The image capturing apparatus according to claim 1, wherein the controller controls the phase difference detection signal processor to perform a correlation operation on signals of the plurality of photoelectric conversion portions of each of the unit pixels and output a value calculated by the correlation operation.

7. The image capturing apparatus according to claim 1, wherein the image sensor further comprising a plurality of holding circuits that hold signals output from the plurality of photoelectric conversion portions of each of the unit pixels.

8. The image capturing apparatus according to claim 1, wherein the image sensor further comprising a plurality of holding circuits that hold signals output from the plurality of photoelectric conversion portions of each of the unit pixels on a column-by-column basis.

9. The image capturing apparatus according to claim 1, wherein the image capture signal processor has a compression processor that compresses and outputs signals of the plurality of photoelectric conversion portions of each of the unit pixels.

10. The image capturing apparatus according to claim 9, wherein the compression processor combines and averages the signals of the plurality of photoelectric conversion portions of each of the unit pixels.

11. The image capturing apparatus according to claim 1, wherein the image sensor having a stacked structure formed by a plurality of semiconductor substrates, and wherein the pixel portion is formed on a first semiconductor substrate, and the image capture signal processor and the phase difference detection signal processor are formed on a second semiconductor substrate.

12. An image capturing apparatus comprising:
an image sensor; and
an image processor that processes signals output from the image sensor and generates an image,
wherein the image sensor includes:
a pixel portion in which a plurality of pixels that photoelectrically convert light from a subject are disposed;
a subject detection portion that detects a subject area in which a subject image exists in the pixel portion; and
an output portion that outputs signals of the pixels of an entire area of the pixel portion to outside of the image sensor for generating an image, and outputs the signals of the pixels of the subject area of the pixel portion which was detected by the subject detection portion to outside of the image sensor for calculating an evaluation value.

13. The image capturing apparatus according to claim 12, wherein the image sensor further comprising an A/D conversion portion that converts the signals that are output from the pixels into digital signals.

14. The image capturing apparatus according to claim 12, wherein each of the pixels has one micro lens and a plurality of photoelectric conversion portions.

15. The image capturing apparatus according to claim 12, wherein the image sensor having a stacked structure formed by stacking a plurality of semiconductor substrates.

16. An image capturing apparatus comprising:
an image sensor; and
an image processor that processes signals output from the image sensor and generates an image,
wherein the image sensor includes:
a pixel portion in which a plurality of pixels that photoelectrically convert light from a subject are disposed;
a light metering portion that calculates a light metering evaluation value using signals of the pixels of a partial area of the pixel portion; and
an output portion that outputs the signals of the pixels of an entire area of the pixel portion to outside of the image sensor for generating an image, and outputs the light metering evaluation value to outside of the image sensor for performing automatic exposure control.

17. The image capturing apparatus according to claim 16, wherein the image sensor further comprising an A/D conversion portion configured to convert the signals that are output from the pixels into digital signals.

18. The image capturing apparatus according to claim 16, wherein each of the pixels has one micro lens and a plurality of photoelectric conversion portions.

19. The image capturing apparatus according to claim 16, wherein the image sensor having a stacked structure formed by stacking a plurality of semiconductor substrates.

* * * * *